(12) United States Patent
Lynggaard et al.

(10) Patent No.: US 8,271,864 B2
(45) Date of Patent: Sep. 18, 2012

(54) ELECTRONIC REPRESENTATIONS OF POSITION-CODED PRODUCTS IN DIGITAL PEN SYSTEMS

(75) Inventors: Stefan Lynggaard, Lund (SE); Johan Zander, Malmö (SE)

(73) Assignee: Anoto AB, Lund (SE)

( * ) Notice: Subject to any disclaimer, the term of this patent is extended or adjusted under 35 U.S.C. 154(b) by 1069 days.

(21) Appl. No.: 12/216,586

(22) Filed: Jul. 8, 2008

(65) Prior Publication Data

US 2009/0019360 A1 Jan. 15, 2009

Related U.S. Application Data

(60) Provisional application No. 60/929,908, filed on Jul. 17, 2007.

(30) Foreign Application Priority Data

Jul. 10, 2007 (SE) ...................... 0701675

(51) Int. Cl.
G06F 17/00 (2006.01)

(52) U.S. Cl. ......... 715/200; 715/243; 715/255; 715/234

(58) Field of Classification Search .......... 715/230–233, 715/268, 200, 234, 243, 255; 345/173, 176, 345/179; 382/187–188

See application file for complete search history.

(56) References Cited

U.S. PATENT DOCUMENTS

| | | | |
|---|---|---|---|
| 5,661,506 A | 8/1997 | Lazzouni et al. | |
| 6,330,976 B1 | 12/2001 | Dymetman et al. | |
| 6,525,716 B1 * | 2/2003 | Makino | 345/173 |
| 6,663,008 B1 | 12/2003 | Pettersson et al. | |
| 6,697,056 B1 * | 2/2004 | Bergelson et al. | 345/178 |
| 6,766,944 B2 | 7/2004 | Silverbrook et al. | |
| 6,836,555 B2 * | 12/2004 | Ericson et al. | 382/116 |
| 6,958,747 B2 | 10/2005 | Sahlberg et al. | |
| 7,002,559 B2 | 2/2006 | Ericson | |
| 2001/0024193 A1 * | 9/2001 | Fahraeus | 345/173 |
| 2002/0091711 A1 | 7/2002 | Ericson | |
| 2003/0046256 A1 | 3/2003 | Hugosson et al. | |
| 2003/0061188 A1 | 3/2003 | Wiebe et al. | |
| 2004/0145768 A1 * | 7/2004 | Stringham | 358/1.14 |
| 2006/0122962 A1 * | 6/2006 | Ushiku | 707/1 |
| 2006/0283949 A1 * | 12/2006 | Katsurabayashi et al. | 235/454 |
| 2006/0291725 A1 * | 12/2006 | Frink et al. | 382/187 |
| 2007/0043685 A1 * | 2/2007 | Fransson et al. | 707/1 |

FOREIGN PATENT DOCUMENTS

| | | |
|---|---|---|
| WO | WO 2006/004505 | 1/2006 |
| WO | WO 2006/004506 | 1/2006 |
| WO | WO 2006/041387 | 4/2006 |
| WO | WO 2007/097693 | 8/2007 |
| WO | WO 2007/117201 | 10/2007 |
| WO | WO/2008/118079 | 10/2008 |

* cited by examiner

*Primary Examiner* — Thu Huynh

(74) *Attorney, Agent, or Firm* — Finnegan, Henderson, Farabow, Garrett & Dunner LLP

(57) ABSTRACT

Disclosed methods, computer-readable media, and systems relate to position-coded products and processing data from such products. In one implementation, a computer-readable storage medium stores a program for a computer to perform a method for creating an electronic representation of a position-coded product. The method may access an electronic document file with a set of document pages and map the document pages, copy for copy, within a selected number of copies, to pattern pages according to an ordering of the pattern pages.

52 Claims, 22 Drawing Sheets

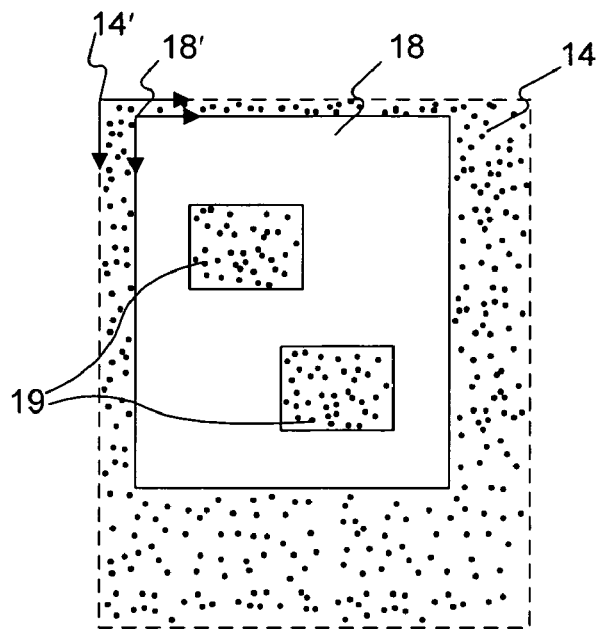
FIG. 8
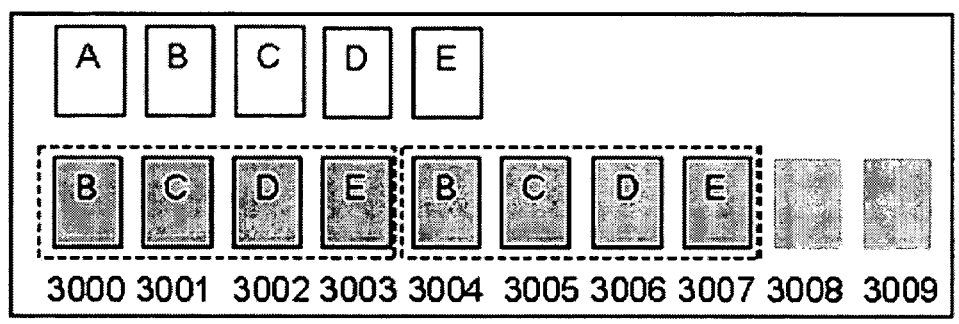
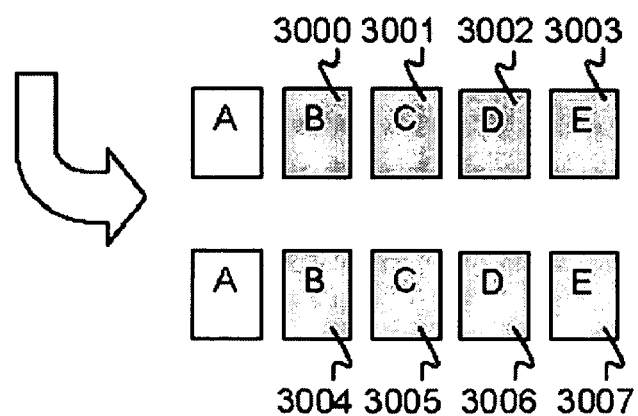
FIG. 9

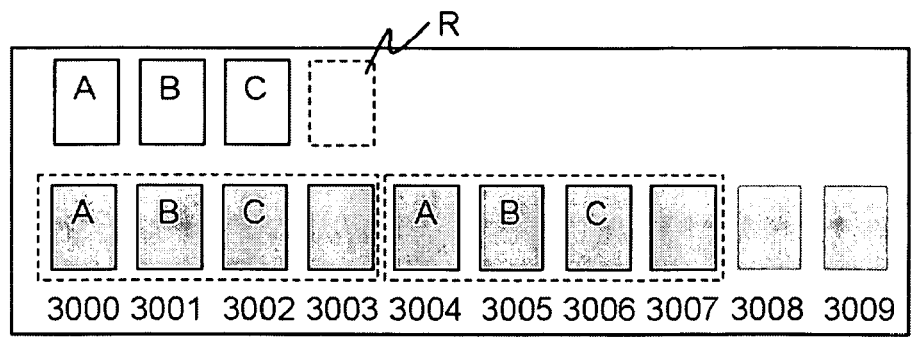
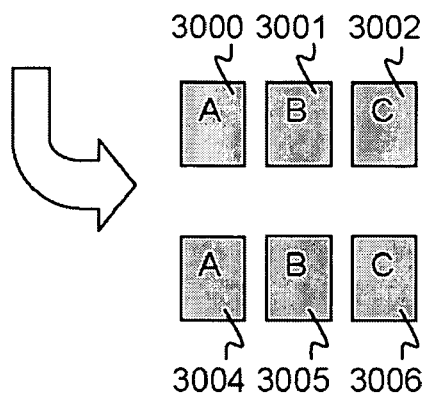
FIG. 10
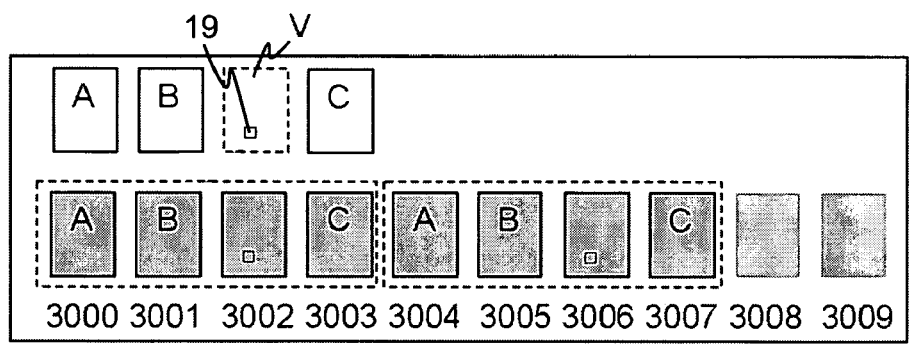
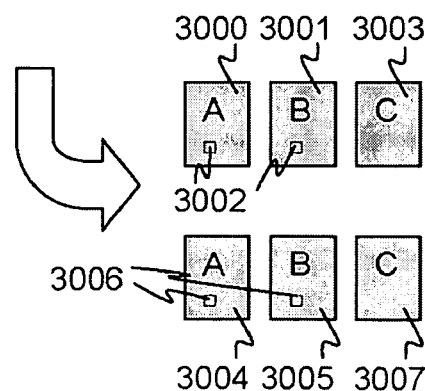
FIG. 11

```
[GENERAL]
/main.info
/main.document
/main.pattern

[PATTERN]
/licenses/<pageaddress>_<level>.license

[STATIC]
/pages//page.areas
/pages//page.gfx
/pages//page.areas.<property.suffix>

[DYNAMIC]
pages/instances/c<copy#>p.areas
pages/instances/c< copy#>p .gfx
pages/instances/c< copy#>p. <property.suffix>

[RESOURCES]
/pages/resources/*.*

[GENERATED DATA]
/data/<pageaddress>/<penID>/<transaction-time-low>-<transaction-time-high>.stf
```

FIG. 12 main.info:

```
AFD_version
info_file_version
GUID
target_uri
owner
author
pageaddress_start
pageaddress_stop
current_copy
total_number_of_copies
```

FIG. 13 main.document:

```
version
locked
pattern_ref
nr_of_reserved_pages
page basepath (0..n)
        areasfile_ref
        gfxfile_ref
        width
        height
        has_pattern
```

FIG. 14

<pageaddress>_<level>.license:

```
version
level
owner
license_info
parentID
width
height
expiry_date
creation_date
userID
pageaddress_start
pageaddress_stop
permissions
signature
public_key
```

FIG. 15A main.pattern:

| |
|---|
| version<br>start_pa<br>copies |

| | |
|---|---|
| start_pa: 10 | copies: 7 |
| start_pa: 100 | copies: 2 |

```
start_pa: 10         copies: 7
start_pa: 100        copies: 2
start_pa: 200        copies: 1
```

FIG. 16C page.areas:
```
shapes_version
areaID: shape
          coordinate x, y
```

FIG. 17 page.gfx:
```
graphics_version
elementid
          image
          text
          pattern area
          scale
          color
```

FIG. 18 form1.aft:

```
/main.info
/main.document
/pages/0/page.areas
/pages/0/page.gfx
/pages/1/page.areas
/pages/1/page.gfx
/pages/resources/layoutpage0.eps
/pages/resources/layoutpage1.eps
```

FIG. 19 form1.afd:

```
/main.info
/main.document
/main.pattern
/licenses/3000_3.license
/pages/0/page.areas
/pages/0/page.gfx
/pages/1/page.areas
/pages/1/page.gfx
/pages/instances/c1p0.areas
/pages/instances/c0p1.gfx
/pages/instances/c1p0.gfx
/pages/instances/c1p1.gfx
/pages/resources/layoutpage1.eps
/pages/resources/layoutpage2.eps
```

FIG. 20A pen.afs:
/main.info
/main.document
/data/3000/AJX-AAB-HPD-W3/0x00001234567 89012-0x00001234567 89013.stf
/data/3001/AJX-AAB-HPD-W3/0x00001234567 89012-0x00001234567 89013.stf main.info:

afdversion: 1.0 infoversion: 1.0 guid: 0x0beb2cf5512b6ee9 author: John Doe pagestart: 3000 pagestop: 3003 currentcopy: 0 totalcopies: 2

FIG. 22 main.document:

```
<document version=1.0 locked="1" pattern_ref="main.pattern">
    <page basepath="pages/0"
    areasfile_ref="page.areas"
    gfxfile_ref="page.gfx"
    width="5600"
    height="7920"
    haspattern="1"/>

<page basepath="pages/1"
    areasfile_ref="page.areas"
    gfxfile_ref="page.gfx"
    width="5600"
    height="7920"
    haspattern="1"/>
</document>
```

FIG. 23 main.pattern:
```
<pattern version="1.0">
    <item start_pa="3000" copies="2"/>
</pattern>
```

FIG. 24 page.areas:
```
<areas version="1.0">
    <areaid="0" shape="Ellipse">
        <coordinate x="400" y="400"/>
        <coordinate x="480" y="560"/>
    </area>
    <areaid="1" shape="Rect">
        <coordinate x="352" y="352"/>
        <coordinate x="440" y="440"/>
    </area>
</areas>
```

FIG. 25 page.gfx:
```
<graphics version="1.0">
    <setbase elementid="0" scale="mm">
    <drawingarea elementid="0" x="0.000" y="0.000" width="50.000" height="50.000"/>
    <setcolor elementid="1" r="0.000000" g="0.000000" b="0.000000"/>
    <text elementid="2" x="50.000" y="50.000" text="This is the first page" font="CourierStd" size="32.000"/>
    <image elementid="3" src="pages/resources/notepad.pdf" x="10.000"
    y="10.000" width="100.000" height="100.000" page="1"/>
    </setbase>
</graphics>
```

FIG. 26

ELECTRONIC REPRESENTATIONS OF POSITION-CODED PRODUCTS IN DIGITAL PEN SYSTEMS

RELATED APPLICATION

This application claims the benefit of priority to Swedish Patent Application No. 0701675-1, filed on Jul. 10, 2007, and U.S. Provisional Patent Application No. 60/929,908, filed on Jul. 17, 2007, the disclosures of which are expressly incorporated herein by reference, in their entirety.

TECHNICAL FIELD

The present invention generally relates to a technology platform for generating position-coded products and processing data from such products.

BACKGROUND

It is known to print document pages with a position-coding pattern. The resulting position-coded product is thus embedded with positions on its surface. These positions can be retrieved from the product surface by the use of a digital pen, which may have a scanner at its front end for reading the pattern.

This technology can be used to electronically capture and process handwriting (e.g., pen strokes) drawn with the digital pen on the product. By providing different pattern on different products, or even different copies of the products, the captured pen strokes can be uniquely assigned to a specific product or copy. This opens up the possibility of managing the captured pen strokes based on their position content. For example, a system component may direct captured pen strokes to a specific receiving computer that is dedicated to processing data from a specific product. The receiving computer may associate areas on the originating product with processing rules, and process the captured pen strokes according to these rules. Accordingly, the resulting system is transparent to the end user, who may work as if using ordinary pen and paper. Although such a system is simple to use, the underlying system architecture may be complex.

Generally, a design tool is provided to allow a deployer to design a product and to generate a print file that defines one or more copies of the position-coded product. Furthermore, the receiving computer may require an application program for processing the captured pen strokes. Suitably, this application program may operate based on a product definition that defines the placement of a pattern on the product and the location of areas on the product. Thus, a product definition may need to be created and made available to the respective application program. Generally, it may also be desirable for the digital pen to be controlled by the positions on the product, e.g., the pen may vibrate or provide other feedback whenever it is placed on certain areas of a product. Thus, it may be necessary to create and distribute a basic product definition for digital pens. It may also be desirable to distribute one or more background images of the product to the application programs and/or to a peripheral device nearby the user, to allow the captured pen strokes to be displayed to the user against a background image of the product. Such a system may be complex and require distribution of many files of enabling data to different system components.

SUMMARY

The present invention may provide electronic document files, methods, computer-readable media, and systems for development, design, and deployment of digital pen systems.

According to an embodiment of the invention, there may be provided a computer-readable storage medium storing a program for causing a computer to perform a method. The method may create an electronic representation of a position-coded product. The method may include, for example, accessing an electronic document file. The electronic document file may include, for example, an indication of a number of copies, a set of document pages for each copy, at least one pattern license identifying a set of pattern pages, each pattern page being a unique part of a position-coding pattern, and metadata indicating an ordering of the pattern pages. The document pages may be associated with the pattern pages. The document pages may be implicitly associated, copy for copy, with the pattern pages according to the ordering. The method may further include deriving the metadata and the set of document pages from the electronic document file; mapping the document pages, copy for copy within the selected number of copies, to the pattern pages according to the ordering; and generating a printable representation of each copy of each document page merged with its mapped pattern page.

According to another embodiment of the invention, there may be provided a method including, for example, accessing an electronic document file comprising layout specifications for a set of document pages; adding to the electronic document file an indication of a number of copies of the set of document pages; adding to the electronic document file at least one pattern license identifying a set of pattern pages, each pattern page being a unique part of a position-coding pattern; and adding to the electronic document file metadata that indicates an ordering of the pattern pages.

According to still another embodiment of the invention, there may be provided a method for manipulating an electronic document file that represents a position-coded product. The method may include, for example, adding layout specifications for a set of document pages to the electronic document file. Each document page may correspond to a page of the product. The method may further include, adding at least one pattern license identifying a set of pattern pages to the electronic document file. Each pattern page may be a unique part of a position-coding pattern. The method may also include, activating the electronic document file for a number of product copies; adding to the electronic document file metadata indicating an ordering of the pattern pages; and associating the document pages, copy for copy within the number of activated product copies, with the pattern pages according to the ordering.

According to another embodiment of the invention, there may be provided a method for representing a position-coded product in a digital pen system. The method may include, for example, creating an electronic document file of a predetermined format. The electronic document file may include a set of document pages. The method may further include, adding to the electronic document file at least one pattern license identifying a set of pattern pages with a given ordering. Each pattern page may be a unique part of a position-coding pattern. The method may also include, activating the electronic document file for a number of product copies. Each product copy may contain the set of document pages, and the document pages may be associated with the pattern pages. The association may be implicit and according to the ordering. The method may also include printing the activated product copies by deriving the document pages and the associated pattern pages based on the electronic document file; and indicating the activated product copies thus-printed in the electronic document file.

According to another embodiment of the invention, there may be provided a system for enabling data collection. The system may include, for example, a paper design component for creating an electronic document file of a predetermined format. The electronic document file may include a set of document pages. The system may further include, a paper activation component for adding to the electronic document file at least one pattern license identifying a set of pattern pages with a given ordering. Each pattern page may be a unique part of a position-coding pattern. The paper activation component may also be for activating the electronic document file for a number of product copies. Each product copy may contain the set of document pages, and the document pages may be associated with the pattern pages. The document pages may be associated implicitly. The system may also include a printer for printing a number of the activated product copies by deriving the document pages and the associated pattern pages based on the electronic document file.

According to another embodiment of the invention, there may be provided a method for enabling printing of a selected number of copies of a position-coded product. The method may include, for example, accessing an electronic document file according to the first aspects; deriving the metadata and the set of document pages from the file; mapping the document pages, copy for copy within said selected number of copies, to the pattern pages according to said ordering; and generating a printable representation of each copy of each document page merged with its mapped pattern page.

One or more of the above embodiments may allow the position-coded product, and all copies thereof to be represented by a single data file. Data pertaining to the product may be contained in one electronic document file, which may be made available to the different system components in a digital pen system. Depending on the functions to be performed on the data pertaining to the product by the different system components, different software or software modules may be used. The different system components may be provided with the software modules needed to perform the respective functions in the digital pen system. Meanwhile, the single data file may be used and distributed between the different system components. The software modules of the system components may provide access possibilities to manipulating the file required by the respective system components. Even though the single data file may include information that should not be available for manipulation by all the different system components, the access to the parts of the file may be controlled by the software modules used by the respective system components. Thus, using a single data file, distribution and handling of enabling data may be facilitated, thereby it may simplify development, design and deployment of digital pen systems. For instance, there may be no need to keep track of which files or information each system component needs in order to perform its functions. It may be sufficient that the system component receives the single data file, and the software run by the system component may control which functions it may perform.

Using an implicit mapping of copies and document pages to pattern pages may ensure that the size of the electronic document file does not become excessive even if it represents many copies of a product. For example, implicit mapping may be accomplished simply on the basis of the order of the pattern pages and the order of the documents pages. For example, simply based on order, the xth pattern page may be implicitly associated with the xth document page. Alternatively, the invention may include a formula that maps a pattern page to a document page. (e.g., the xth pattern page may be associated with the xth+y document page, or some other formula). Regardless of the implicit mapping scheme employed, memory usage may be reduced because location data associating every document page with every pattern page need not necessarily be stored, such as in an electronic document file. The copies and document pages may be mapped to the pattern pages using a convention common to the entire digital pen system. Thus, when a pattern license identifying a set of pattern pages is added to the electronic document file, the pattern pages may be directly mapped to the document. Thanks to this convention, there may be no need for specifying the mapping of document pages to pattern pages. This implies that the size of the electronic document file may be kept small. Specifically, the size of the electronic document file may not be affected by the number of copies and document pages that are mapped to pattern pages.

Also, the implicit mapping may provide that a distributed handling of the electronic document file may be facilitated. The different components of the digital pen system may be specifically adapted to their respective purpose and need only be able to perform the specific functions. For example, the paper design component may not need to be able to handle any licenses of position-coding pattern. It may even be an ordinary document design tool adapted to handle the file format of the electronic document file. Furthermore, the paper activation component may not need to be able to handle any printing of documents, whereas the paper print component may not need to be able to manipulate any content of the electronic document file. The implicit mapping may provide that the position-coding pattern is printed in the same combination with the document pages as specified during adding of a license. Thus, different actions to be taken in creating a position-coded product may conveniently be distributed and be adapted to actions taken by different parties in printing of non-position-coded products. Also, the complexity of the system components may be small and/or small amounts of information need to be transmitted between the system components.

Further, when interpreting a recorded position, it may easily be associated with the document page that is mapped to the relevant pattern page according to the implicit mapping. Also, captured pen strokes may be easily presented with the background by combining a pattern page corresponding to the strokes with the associated document page. Furthermore, the electronic document file may represent the individual copies of the printed product with or without strokes, as well as any copies to be printed.

Also, the electronic file may be updated to represent a further set of copies of the product by simply adding one or more pattern licenses to the file and updating the metadata of the file to indicate the proper ordering of the pattern pages that are indicated by the pattern licenses in the file. Thus, there may be no need to create a new file handling the mapping of the document pages to the added pattern pages. Also, there may be no need for specifying how the document pages should be mapped to the pattern pages. This may be handled by the used convention for mapping document pages to pattern pages, once the pattern license has been added to the file. Thus, the structure of the electronic document file may both save processing time and memory resources in the event that new copies of a product are to be created.

The possibility of adding pattern licenses to the file also enables a predefined layout of document pages to be reused at any time. Thus, once a layout has been designed, the single electronic document file may be used to represent any future printed copies of the position-coded product, regardless of how many copies are made and when the copies are printed.

Moreover, since the electronic document file merely comprises a pattern license identifying a set of pattern pages, the electronic document file is vastly reduced in size compared to a file comprising the actual graphical code symbols forming the position-coding pattern. A file comprising the actual graphical symbols may be huge, since the symbols are densely provided on a product. Therefore, the structure of the electronic document file facilitates designing the layout of document pages in a first step and thereafter transmitting the file with the indication of the pattern pages to a specialized printing facility for printing a number of copies of the position-coded products. The specialized printing facility need only have software for reading the layout of the document pages and the pattern license, and for creating the graphical symbols of the position-coding pattern. There is no need to enable the printing facility to perform any manipulation of the file. Further, the electronic document file may be provided with tying data that ties the pattern license to the electronic document file. This may prevent the pattern license to be moved between files or be manipulated to include further pattern pages at the printing facility.

Furthermore, the pattern license may specify any number of pattern pages. This implies that the number of pattern pages may be adapted to the intended number of copies of the document pages to be produced. Thus, the waste of unused pattern pages in the allocation of pattern to the electronic document files may be kept at a minimum.

It is also possible to introduce captured pen strokes into the electronic document file and allow presenting of the layout of the document page with the entered strokes to reproduce the appearance of the printed product on which strokes have been drawn with a digital pen. Furthermore, the document may be printed again together with the strokes for allowing further handling of the document with a digital pen on a printed product.

It is to be understood that both the foregoing general description and the following detailed description are exemplary and explanatory only and are not restrictive of the embodiments of the invention, as claimed.

BRIEF DESCRIPTION OF THE DRAWINGS

The accompanying drawings, which are incorporated in and constitute a part of this disclosure, illustrate embodiments and aspects of the present invention. In the drawings:

FIG. 8 is an exemplary conceptual view to illustrate a convention for mapping a document layout to a pattern page;

FIG. 9 is an exemplary conceptual view of the content of an AFD file using a has_pattern parameter and the resulting printed product;

FIG. 10 is an exemplary conceptual view of the content of an AFD file using a reserved page and the resulting printed product;

FIG. 11 is an exemplary conceptual view of the content of an AFD file using a virtual page and the resulting printed product;

FIG. 12 illustrates an embodiment of the AFD format;

FIGS. 13-18 illustrate examples of parameters available as file content under the AFD format of FIG. 12;

FIG. 19 is an example of the content of a non-activated AFD file;

FIG. 20A is an example of the content of the file in FIG. 19 after activation and provision of instance-specific layout data;

FIGS. 22-24 are examples of metadata included in the AFD file of FIG. 20A;

FIGS. 25-26 are examples of area and graphics collections included in an AFD file;

DETAILED DESCRIPTION

Figure 1A:
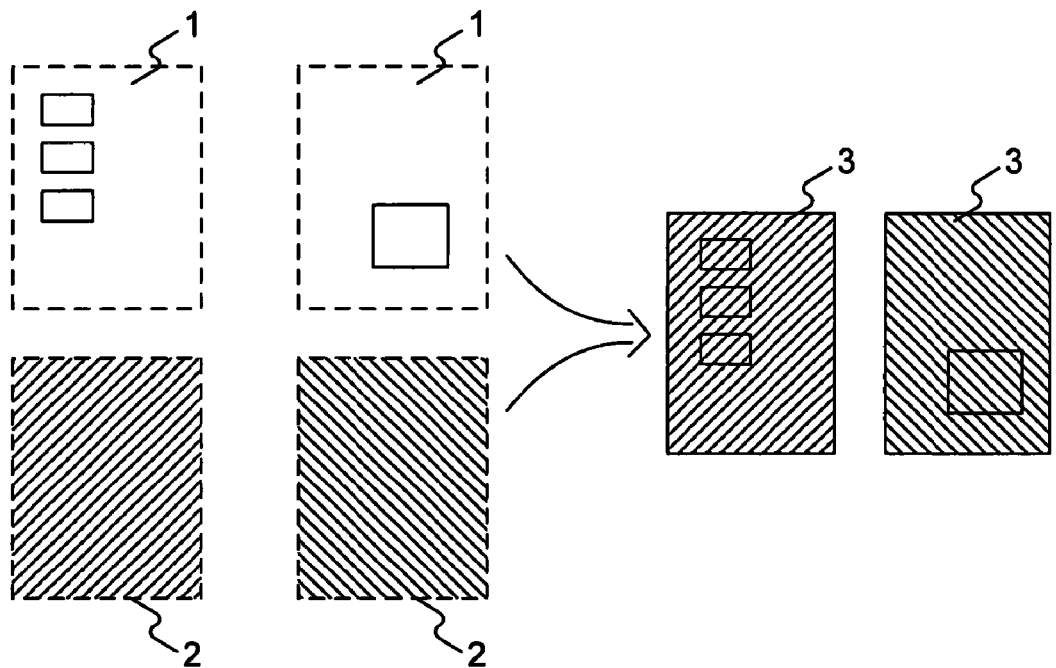
FIG. 1A illustrates an example of forming unique position-coded products by printing different coding pattern and document layouts on sheet substrate.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions, or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

1. GENERAL

The following describes a novel platform for development, design, and deployment of systems for generating and processing data from position-coded products.

These types of systems are based on the use of a position-coding pattern, i.e., a passive machine-readable pattern that can be applied to a substrate, such as paper, to encode position data thereon. The position data can then be retrieved from the encoded substrate by the use of a digital pen, which may have a scanner for reading the pattern. By activating the scanner while the pen is in contact with the substrate, sequences of position data (e.g., pen strokes) may be recorded to represent the pen's movement on the substrate. In this way, an electronic representation of handwriting may be generated.

The machine-readable pattern may be printed together with human-understandable graphics. If each substrate is printed with different pattern, resulting in different position data, it is possible to distinguish between position data originating from different substrates.

Figure 1B:
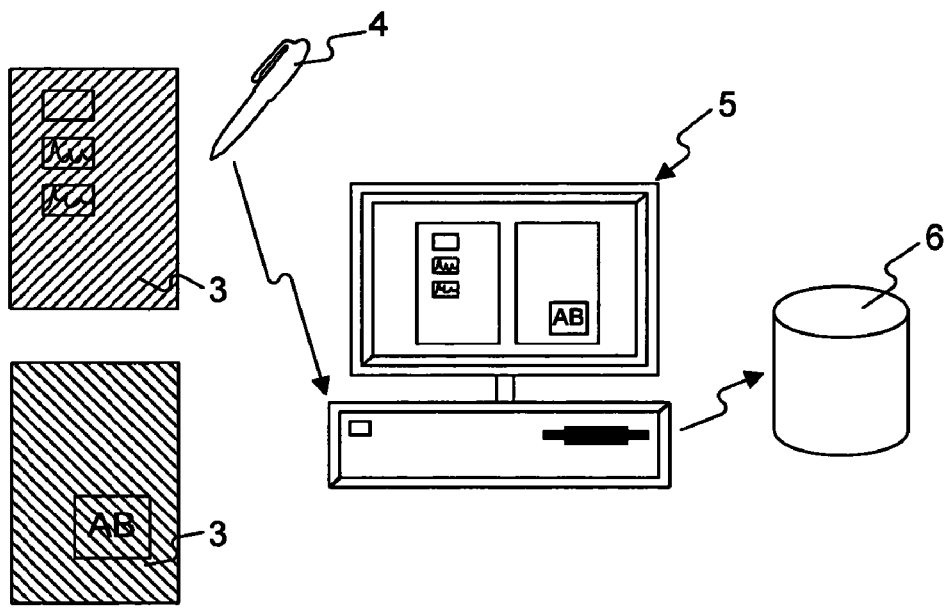
FIG. 1B is a view of an exemplary system for information capture and processing using a digital pen and the products in FIG. 1A.

This principle may be used for information capture and processing. As shown in FIGS. 1A-1B, an electronically represented multi-page form 1 may be printed with unique pattern 2 on each page. When the printed form 3 then is filled in using a digital pen 4, the resulting position data may be conveyed from the digital pen 4 to a back-end processing system 5, in which the position data may be correlated to the individual pages of the originating form. The position data may, for example, be displayed to an operator and/or processed in accordance with processing rules for that specific form, and the resulting data may be stored in a database 6. Different printed copies of the same form may also bear a different pattern, so that the position data uniquely identifies the originating form copy at the back-end system. The digital pen 4 may have a unique penID, which may be conveyed together with the position data, to allow the back-end system 5 to identify the originating pen, or differentiate the received data between different pens.

This type of system may require a large position-coding pattern, since each page (and possibly each copy) needs to be provided with unique pattern.

Figure 2A:
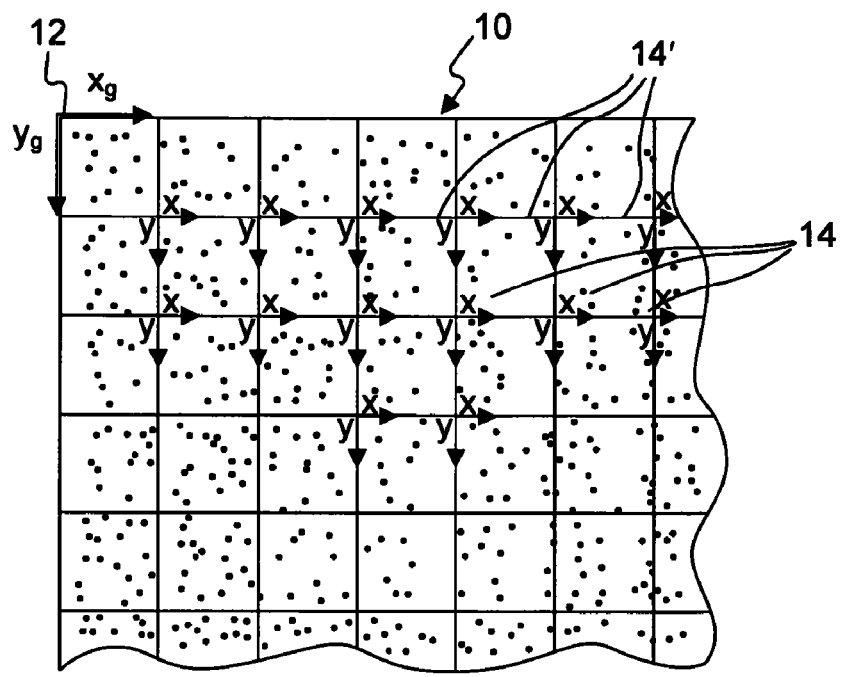
FIG. 2A illustrates an example of a part of an extensive position-coding pattern that may be logically partitioned into pattern pages.

In one embodiment, shown in FIG. 2A, the position-coding pattern 10 may be implemented to encode a large number of positions, in a global x,y coordinate system 12 ($x_g$,$y_g$). Thus, the position-coding pattern 10 represents a huge continuous surface of positions. This huge pattern may be then logically subdivided into addressable units 14, pattern pages, of a size suitable for a single physical page. Thus, each page may be printed with pattern from a different pattern page 14, so that each printed page is encoded with unique positions in the global coordinate system 12. The subdivision of the position-coding pattern is known in the system, so that a page address (PA) for the relevant pattern page 14 can be derived from each recorded position. As shown in FIG. 2A, each pattern page 14 may be associated with a local coordinate system 14', whereby a recorded position (in the global coordinate system 12) can be converted to a page address and local position (in the local coordinate system 14') of the pattern page 14 identified by the page address. Such a coding pattern and a subdivision thereof are disclosed in U.S. Pat. No. 6,663,008 and U.S. 2003/0061188.

Figure 2B:
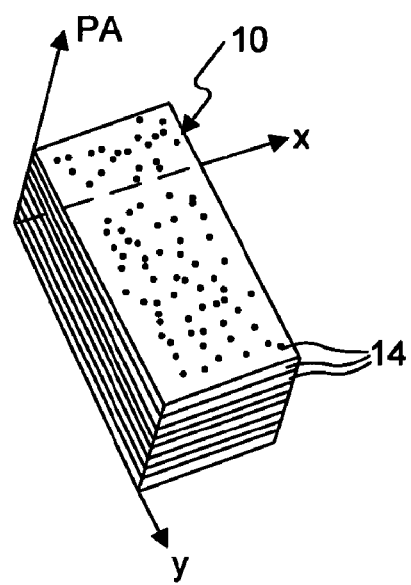
FIG. 2B is an exemplary conceptual view of a position-coding pattern that may encode pattern pages with identical x,y coordinates.

In another embodiment, shown in FIG. 2B, the position-coding pattern 10 may be divided into pattern pages 14 by way of its encoding. Specifically, the position-coding pattern 10 encodes a plurality of unique pattern pages 14, in which the encoded positions are identical between different pattern pages, but each pattern page may be encoded with a unique identifier. Thus, the digital pen records position data in the form of a unique identifier (a page address, PA) and x,y coordinates within a pattern page. Such coding patterns are known from U.S. Pat. No. 6,330,976, U.S. Pat. No. 5,661,506 and U.S. Pat. No. 6,766,944.

In either embodiment, the position-coding pattern 10 may define a space of unique pattern pages 14, represented by a PA space. The PA space may be ordered, i.e., the pattern pages 14 can be ordered in sequence based on page address. Thus, PA ranges can be defined in the PA space to identify all pattern pages 14 between a first and a second page address.

2. DIGITAL PEN AND PAPER PLATFORM

There are many conceivable types of information management systems that can be based on the digital pen and paper (DP&P) technology described above. The present Assignee has previously developed a complete infrastructure for generating position-coded products and conveying recorded position data to appropriate processing devices. However, as the technology gains acceptance, a need for tailored systems providing specific functionality has arisen. To promote development of such systems, the present Assignee has now designed a new platform for development of systems based on DP&P technology. The platform includes a number of basic software building blocks, software modules, which provide basic functionality for DP&P systems. These software modules may be provided on any suitable computer-readable storage medium, including a record medium or a read-only memory. Each module may expose at least one API (Application Programming Interface) that can be accessed by a software developer to integrate the module with customized software. Thus, the provision of these basic building blocks may facilitate a system provider to develop tailored system components. The platform may be held together by a common file format (i.e., AFD—Anoto Functionality Document) that conveys data between building blocks.

In one embodiment, the platform may include an Interaction Module (IM), a Document Module (DM), a License Module (LM) and a Print Module (PM).

Figure 3A:
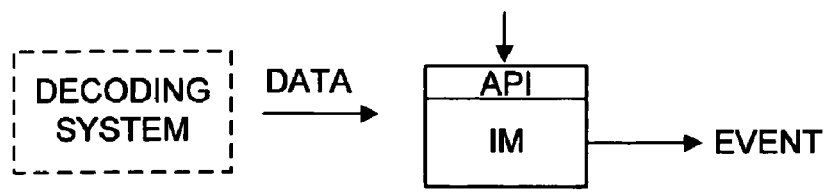
FIG. 3A illustrates an exemplary Interaction Module for processing real-time pen data.

An exemplary Interaction Module is illustrated in FIG. 3A. It operates on a stream of data received from a decoding system in a digital pen. Specifically, the Interaction Module may generate basic events based on real-time pen data. Such basic events may include PenConnected (indicating connection to a specific pen), PenDisconnected (indicating disconnection of a specific pen), Error (indicating a data error in the stream of data), PageUp (indicating that the pen has been lifted from a product surface), Coord (including one item of position data), NewPageAddress (indicating that position data has been received from a new pattern page) and NoCode (indicating an inability to detect pattern). The Interaction Module may also provide refined events, by loading a document specification and by mapping received position data against this document specification. Such refined events may include AreaEnter (indicating that the position data now falls within a specific area), AreaExit (indicating that the position data no longer falls within a specific area), PageEnter (indicating that position data has been received from a new document page). The Interaction Module provides an API allowing an external entity to register for certain events, and to input aforesaid document specification, e.g. in the form of an AFD file (see below).

The Interaction Module may be used inside a digital pen to provide real-time events to a pen control system, or it may be used in an external receiving device to provide real-time events to an interactive application designed to give user feedback in real-time based on pen data. Such an application may thus provide essentially instant visual, audible, or audio-visual feedback to the user of the digital pen based on the manipulation of the pen on a coded product.

Figure 3B:
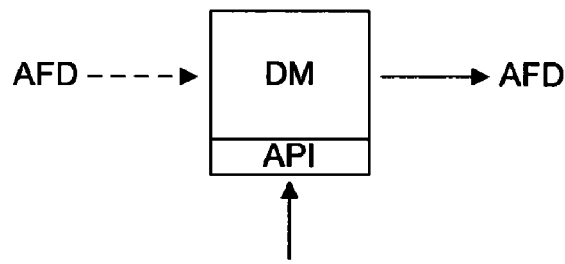
FIG. 3B illustrates an exemplary Document Module for manipulating files in AFD format.

An exemplary Document Module, shown in FIG. 3B, may create a file in the AFD format ("AFD file"), and manipulate data contained therein. Specifically, the Document Module may provide an API for deleting data in and adding data to the file. The Document API may ensure that data is read/written in a consistent way at the correct place in the AFD file.

Figure 3C:
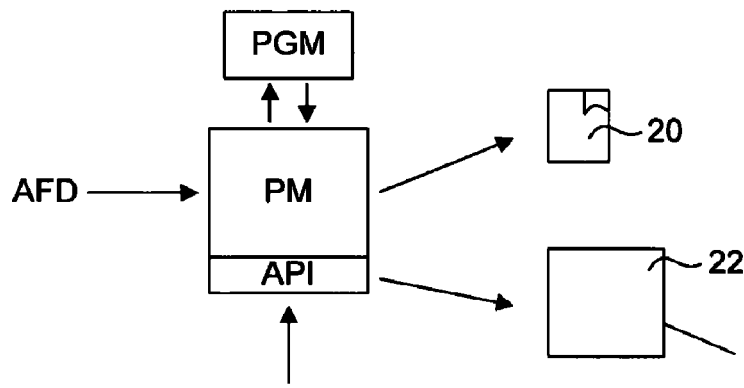
FIG. 3C illustrates an exemplary Print Module for printing position-coded products.

An exemplary Print Module, shown in FIG. 3C, may operate on an AFD file content to generate a printable file 20 of a coded product, e.g. in Postscript or PDF format, or to print the coded product directly on a printer 22. Conceptually, the Print Module merges one or more pages of human-understandable content with a corresponding number of pattern pages (cf. FIG. 1A). Suitably, the Print Module includes or accesses a pattern generation function (PGM in FIG. 3C) which generates the graphical code symbols for a particular pattern page, based on a page address. The Print Module may provide an API for optimizing the printing of the coded product. For example, the API allows setting printing parameters, such as printing speed, fonts, selection/mixture of inks used for printing pattern and human-understandable content, etc. The API also allows adapting parameters of the pattern to properties of the printer, e.g. size of code symbols, nominal spacing of code symbols, placement of code symbols, etc.

Figure 3D:
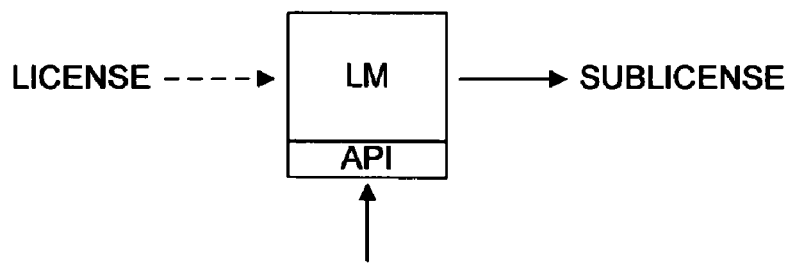
FIG. 3D illustrates an exemplary License Module for generating pattern licenses.

An exemplary License Module, shown in FIG. 3D, may generate pattern licenses that give the holder access to a specific part of the position-coding pattern. A pattern license defines one or more ranges of page addresses, associated permissions, and security data. The permissions give the holder rights to use specific functionality on the platform, e.g. printing the pattern, sending data recorded from the pattern, and storing data recorded from the pattern. The security data may be used to verify that the license is authentic and has not been manipulated since it was created. Pattern licenses can be sublicensed in a number of levels. However, the License Manager ensures that a sublicense does not extend beyond its parent license, i.e., a sublicense can only be given within the PA range of the parent license, and within the functionality permissions of the parent license. The License Module may also be configured to verify a pattern license based on its security data. The License Module provides an API for handling licenses, e.g. creating sublicenses, checking permissions of a license, and verifying a license.

The AFD file format may be used as a structural container for all digital data required to represent an electronic or tangible document within the platform. Thus, the AFD file may identify the human-understandable content of the document, the pattern on the document, the placement of the pattern on the document, functions or properties associated with specific areas in the pattern, etc.

In the context of the present application, a document may be electronically represented as a number of document pages in the AFD file. The AFD file may also electronically represent a number of copies of the document. A specific document page of a specific copy of the electronic document is also referred to as a "page instance". The AFD file may also associate a respective pattern page with each such page instance. The AFD file may furthermore indicate whether a page instance is to be printed in tangible form or not.

The AFD file may be used to represent the document as it migrates through a DP&P system built on the above-mentioned modules, e.g. when the document is designed, when the document is activated with pattern in the system, when the document is printed in the system, when data recorded from the printed document is transported in the system, and when the recorded data is processed in the system. Thus, the content of the AFD file may be changed in a structured manner as the AFD file is migrated between the above-mentioned modules.

3. FILE STRUCTURE

Before illustrating the use of the AFD file in an exemplifying system implementation, the data structure of the AFD file will be briefly explained.

In one embodiment, the data is organized in the AFD file by document page, and possibly by page instance. In an alternative embodiment, the data is organized in the AFD file by page address.

Figure 4:
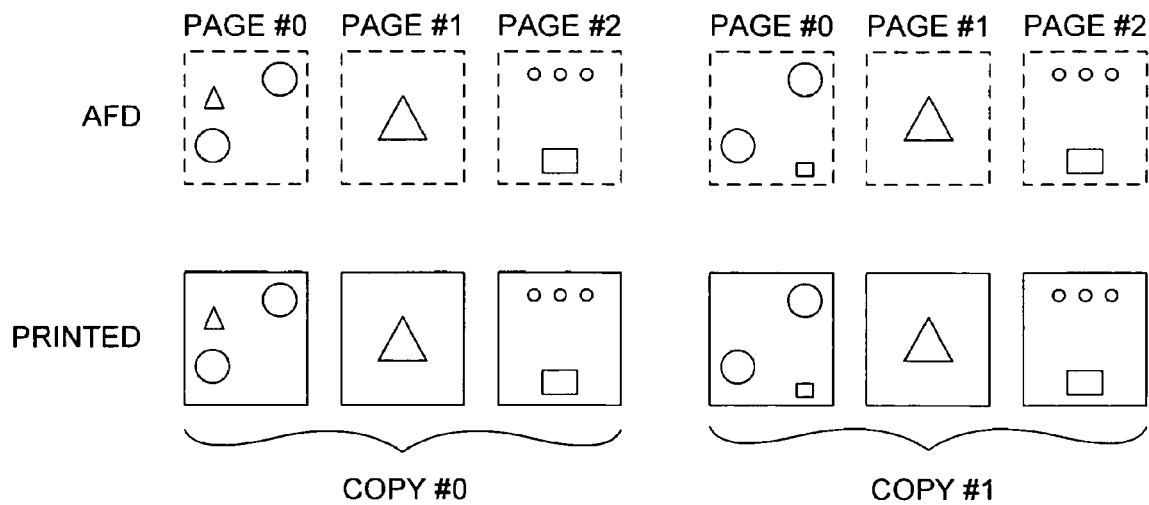
FIG. 4 is an exemplary conceptual view of a correspondence between the digital representation of a document and the corresponding tangible product.

In either case, the Document API may allow access to the AFD file using an index to individual instances of each document page. Suitably, this index references each instance by a combination of a copy number (copy#) and a page number (page#). Thereby, there is a perceived correspondence between the digital representation of the document and its eventually printed counterpart, which is realized as a number of copies, each consisting of a number of pages, see FIG. 4. This analogy between the physical and digital worlds may be of great help to a system developer/deployer. If the data is organized by page address in the AFD file, the file may contain conversion data relating page addresses to page instances (copy#, page#), and the Document API may include a function to convert from instance (copy#, page#) to page address, and vice versa.

To facilitate access and readability, the AFD file may also be structured into mandatory storage sections, each being dedicated for a specific category of data. Within these storage sections, data may be structured by (copy#, page#) and/or page address, as applicable.

The AFD format may allow system developers to add customized storage sections, which will be ignored by the above Document API but can be accessed through a file reader of choice. This will allow system developers/deployers to associate any type of data with a document through its AFD file. For this purpose, it is clearly desirable for the AFD file to be accessible via standard file readers and/or text editors.

In one embodiment, the AFD file is written in a descriptive markup language such as XML and tagged to identify different storage sections.

In another embodiment, the AFD file is implemented as an archive file which aggregates many files into one, suitably after compressing each file. This allows different types of files to be stored in their original format within the AFD file, and provides for a small file size of the AFD file. The different storage sections in the AFD file may be given by folders and/or files within the archive file. In one specific embodiment, the archive file is a ZIP file.

Figure 5:
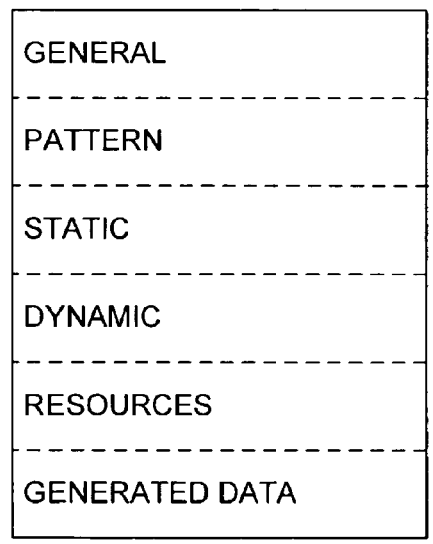
FIG. 5 illustrates exemplary storage sections in an AFD file.

In one embodiment, shown in FIG. 5, the AFD file may include the six mandatory categories of data, which may or may not be given as explicit storage sections in the AFD file: GENERAL, PATTERN, STATIC, DYNAMIC, RESOURCES and GENERATED DATA. GENERAL includes metadata about the document, including mapping data indicating the mapping between pattern pages and page instances. PATTERN includes one or more pattern licenses that each defines a set of pattern pages. STATIC includes page specifications (page templates) that define an invariant layout for each document page, i.e., layout data which is relevant to all instances (copies) of a document page. Such layout data may include graphical elements, active areas, and properties associated with such active areas. Active areas are not identifiable as such on the printed document, but are defined in relation to one or more document pages for use in subsequent processing of position data recorded from the printed document. Graphical elements include human-understandable elements (lines, icons, text, images, etc) as well as pattern areas, i.e., subsets of the actual coding pattern. DYNAMIC includes page specifications that define instance-specific layout data, i.e., layout data which is unique to a particular instance (copy) of a document page. Such layout data may also include graphical elements, active areas, and properties associated with such active areas. RESOURCES includes resources that are either common to the document or that are referenced by the static or dynamic page specifications. GENERATED DATA includes data that is generated in connection with the tangible document (the coded product as printed), such as pen strokes, pictures, sound, etc.

The AFD file may contain tying data that exclusively ties the pattern license(s) to the AFD file, to prevent that pattern licenses are moved between AFD files. This feature might be important in order to avoid collisions in the DP&P system caused by the same position data being recorded from different coded products. Furthermore, it might be important for securing revenue from pattern licenses.

4. EXAMPLE

Forms Processing System

Figure 6:
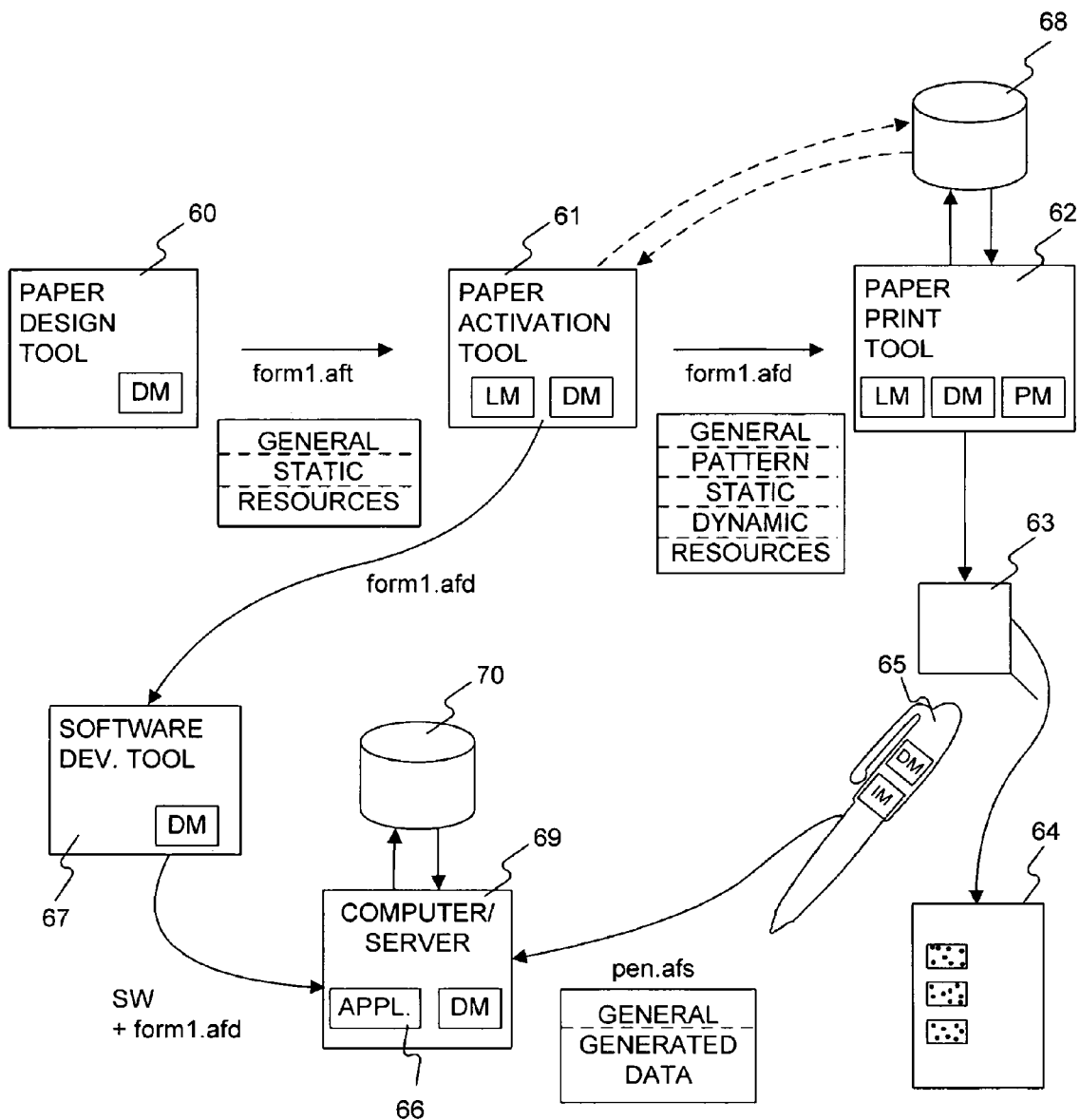
FIG. 6 illustrates an exemplary forms processing system built on the modules of FIGS. 3A-3D and using the AFD file format of FIG. 5.

FIG. 6 illustrates exemplifying system components built on the above-mentioned building blocks for use in a forms processing system. The system may include a Paper Design Tool 60 that creates the layout of a document, a Paper Activation Tool 61 that electronically creates a number of copies of the document layout and provides the document layout with a corresponding amount of position-coding pattern, a Paper Print Tool 62 that merges the electronic copies of the document with the position-coding pattern, a printer 63 that generates a position-coded printout 64 of the document, a digital pen 65 that outputs position data recorded from the printout 64, and a forms processing application 66 that processes the position data in accordance with processing rules associated with the document. The above tools may be implemented by software running on a processing device, such as a PC, a PDA or a mobile phone.

FIG. 6 also illustrates the content of an AFD file as it migrates in the system. The Paper Design Tool 60 may output an AFD file including a static page specification for each document page. At this stage, the AFD file is not yet "activated" in the system, since the document is not associated with any explicit pattern pages. Non-activated and activated AFD files may be distinguished by file name and/or file extension on the platform. In one such embodiment, illustrated in FIG. 6, file extension aft is used for non-activated AFD files, whereas activated AFD files have file extension .afd.

The non-activated AFD file (form 1.aft) is conveyed to the Paper Activation Tool 61, in which the document is activated in a specific number of copies, by associating the document with a sufficient number of pattern pages. This is done by adding a suitable pattern license to the AFD file, together with mapping data which identifies how the available pattern pages are to be mapped to the document. The Paper Activation Tool 61 may also be used to add dynamic page specifications (with instance-specific layout data) to the AFD file. The thus-activated AFD file (form1.afd) is conveyed both to the Paper Print Tool 62 and to a Software Development Tool 67, which is used for creating forms processing software that receives and processes pen data based on the AFD file (i.e. the forms processing application 66). The Paper Print Tool 62 may generate instructions for the printer 63 (online or offline) to print a selected number of position-coded copies 64 of the document. It is to be noted that the selected number of copies to be printed may be equal to or less than the number of activated copies. Thus, the Paper Print Tool 62 may consume at least part of the pattern pages available in the activated AFD file. After the printing operation, the Paper Print Tool 62 may update the AFD file to indicate the consumed pattern pages. The updated AFD file may be stored in an AFD repository 68, so that a user can access the file at a later time to print more copies of the document. If needed, the AFD file can be activated with more pattern pages, by another pattern license being added to the file, using the Paper Activation Tool 61.

It is also to be noted that also the non-activated AFD file (form1.aft) may be conveyed to the Paper Print Tool 62, which may generate a non-position-coded printout of the document.

As shown in FIG. 6, the AFD file format may also be used to convey the pen data from the pen 65 to the forms processing application 66. This might be convenient, since the forms processing application 66 can access both pen data and an AFD file using one and the same API (Document API). Again, file name or file extension may be used to distinguish such an AFD file containing merely metadata and pen data on the platform. In one embodiment, illustrated in FIG. 6, such a pen data file in AFD format has file extension .afs. The pen data typically includes position data (pen strokes) recorded by the pen 65 on one or more of the printed document copies 64, as well as an identifier (penID) which is stored in a memory of the digital pen 65 to uniquely identify the pen in the system.

The forms processing software, created with the Software Development Tool 67, may be installed on a computer/server 69 as a forms processing application 66. The application 66 may need to access the AFD file to apply appropriate processing rules to the received pen data. Specifically, the AFD file may be used to map the received position data to active areas.

Each forms processing application 66 may be customized for a specific form, which is represented by one specific AFD file. Alternatively, a forms processing application 66 may be configured to process data from different forms, each represented by an AFD file. It is thus possible that a plurality of different forms processing applications 66 co-exist on one computer/server 69, and/or that one forms processing application 66 is capable of accessing a number of AFD files. In either case, the computer/server 69 may have access to a repository 70 storing several different AFD files. Upon receipt of position data form a digital pen 65, the computer/server 69 may identify the relevant forms processing application 66 and/or AFD file by matching the received position data to the pattern pages in the different AFD files stored in the repository 70, as will be further described below.

FIG. 6 also indicates the building blocks that may be used in each of the system components. The Paper Design Tool 60 may include a Document Module to create and add data to the AFD file. The Paper Activation Tool 61 may include a License Module to generate appropriate pattern licenses, and a Document Module to add these licenses and further data to the AFD file. The Paper Print Tool 62 may include a Document Module to access the AFD file, and a Print Module to generate printing instructions. The Paper Print Tool 62 may also include a License Module to validate the pattern licenses in the AFD file. The pen 65 may include an Interaction Module to generate pen events for the pen control system, and a Document Module to generate a pen data file in AFD format. The Software Development Tool 67 and/or computer/server 69 may each include a Document Module for accessing files in AFD format.

Thus, the system is structured such that the same software modules may be used by several different system components. Still, each system component does not need to include every software module, whereby the available functions to each system component may be easily controlled.

In one embodiment, the Paper Print Tool 62 need only comprise a Print Module and, optionally, a License Module. Any updates that need to be made to the AFD file upon printing may be performed in the Document Module of the Paper Activation Tool 61 at request for printing of one or more copies of the document pages. This implies that the Paper Print Tool 62 may be very simple to handle and that specialized print shops may be willing to install the Paper Print Tool 62 in order to provide services for printing position-coded products. Also, since the AFD file need not comprise the graphical code symbols of the position-coding pattern, the size of the AFD file may be small, which facilitates transmitting the file between different units. Thus, the system may allow transmitting the AFD file for printing to a Paper Print Tool 62, which may be directly connected to the printer that will produce the position-coded products. This also implies that the Paper Print Tool 62 may be adapted to the characteristics of the specific printer that produces the position-coded products. For instance, colour separation of background images may be adapted to the specific printer and, thereby, an improved printing result may be obtained. Also, parameters of the position-coding pattern may be set such that graphical code symbols of high quality may be produced. For instance, the size of the graphical code symbols may be slightly adjusted depending on the printer that produces the position-coded products for improving the ability of a digital pen to read the pattern. An AFD file containing tying data that exclusively ties the pattern license(s) to the AFD file may be used. This may prevent a pattern license from being moved by the print shop between AFD files or the pattern license from being tampered with. An owner of a proprietary position-coding pattern may issue pattern licenses to a party for designing position-coded products and may allow this party to transmit the pattern license to a print shop for producing the position-coded products. Tying the pattern license to the AFD file may prevent the pattern license from being moved to another AFD file and may prevent the pattern license from being tampered with to increase the range of pattern pages included in the pattern license. This may provide the owner of the position-coding pattern the ability to secure revenues from issuing pattern licenses.

5. MAPPING

5.1. Page Mapping

As indicated above, the activated AFD file (form1.afd) includes page mapping data which defines how the document pages are mapped to pattern pages. The page mapping data may include an explicit reference to a pattern page for each page instance of the document. However, if the document is to be printed in a large number of copies, the size of the AFD file may then become excessive. Mapping by convention may be used, i.e., using a predetermined set of rules to map a given number of copies to a given set of pattern pages. In one such embodiment, the pattern pages in an AFD file (given by its pattern license(s)) may be arranged in an ordered sequence by page address and are then mapped against document pages by dead reckoning, copy for copy.

Figure 7A:
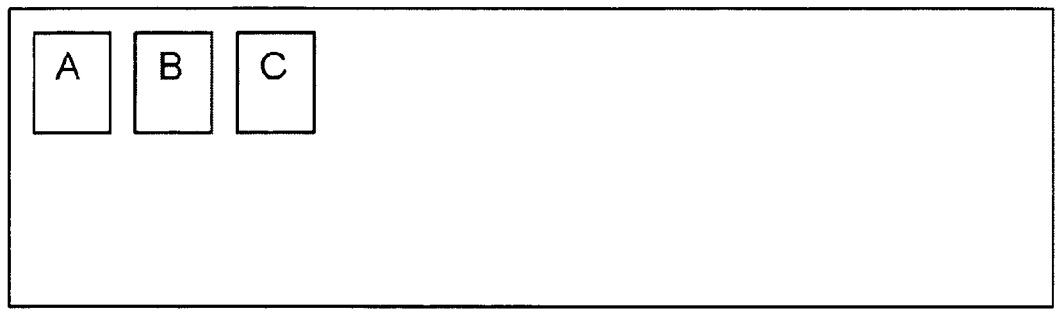
FIG. 7A is an exemplary conceptual view of the content of a non-activated AFD file that defines three document pages.
Figure 7B:
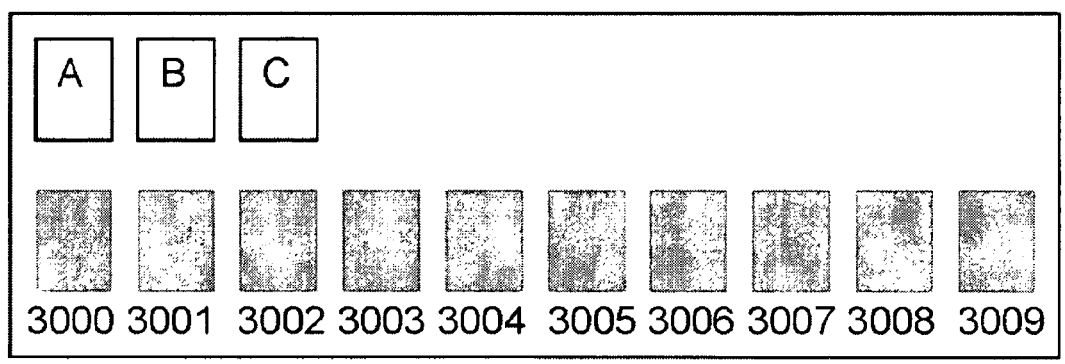
FIG. 7B is an exemplary conceptual view of the content of the file in FIG. 7A after activation with ten pattern pages.
Figure 7C:
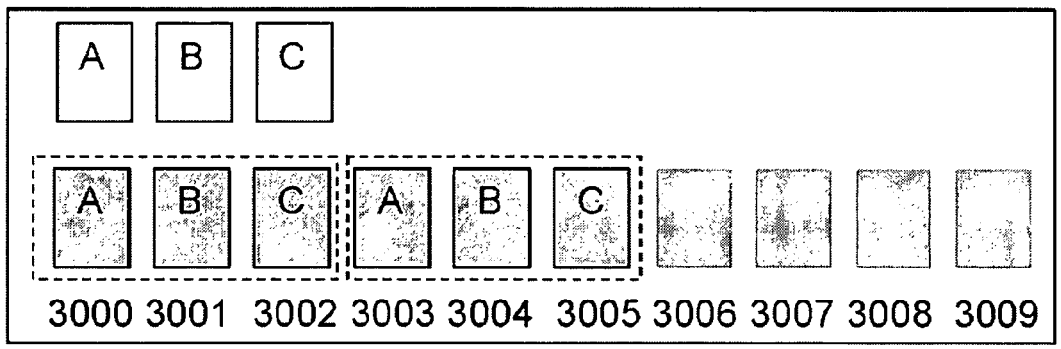
FIG. 7C illustrates an exemplary convention for mapping the document pages to the pattern pages in FIG. 7B.

For example, consider a non-activated AFD file that defines a three-page document, as shown in FIG. 7A. This AFD file is then activated to contain a pattern license that spans 10 pattern pages with page addresses from 3000-3009 (indicated by grey boxes in FIG. 7B). By convention, the document pages of the first copy (copy#0) may be associated with pattern pages 3000, 3001 and 3002, respectively, and the document pages of the second copy (copy#1) are associated with pattern pages 3003, 3004 and 3005, respectively, and so on (indicated by dotted boxes in FIG. 7C). The Paper Print Tool applies this convention to print two position-coded copies of this document based on the thus-activated AFD file. Thereby, pattern pages 3000-3005 are consumed, leaving available pattern pages in the range 3006-3009, as indicated in FIG. 7C. Concurrently, the AFD file is updated to indicate the available pattern pages, so that another 1 copy can be printed from the AFD file at a later time.

In one embodiment, the page mapping data indicates the current first available pattern page in the AFD file. In the above example, the mapping data would be PA=3000 before printing, and PA=3006 after printing.

In another embodiment, the page mapping data may indicate the next copy to be printed. In the above example, the mapping data would be copy#0 before printing, and copy#2 after printing. This type of mapping data might make it easier for a developer/deployer to understand the status of the AFD file, i.e. how many copies can be printed before the AFD file must be activated with more pattern. However, this mapping data requires that the Document Module and Print Module convert "next copy" to page address when mapping document pages to pattern pages. This may be done by dead reckoning from the starting pattern page in the AFD file (given by its pattern license).

In the above example, the mapping order within the PA range may be given by page address. However, in an alternate embodiment, the pattern license of an AFD file may contain more than one PA range, and pattern license(s) can be added to an existing AFD file. Therefore, the AFD file may contain page mapping data that indicate a mapping order for the PA ranges defined in the pattern license(s) in the AFD file. Thus, the page mapping logic sorts the different PA ranges according to the mapping order, and sorts the pattern pages within each PA range according to page address.

5.2. Layout Mapping

The AFD file may also contain layout mapping data which defines the relative placement of the pattern page, or parts thereof, to the document page. The layout mapping data may include explicit location data for each instance of the document, with the location data defining where to place what part of a pattern page.

However, to simplify processing and reduce the AFD file size, the layout mapping data may be partly based on mapping by convention. As explained above (see FIGS. 2A-2B), every pattern page 14 may be associated with a local coordinate system 14' ("pattern page coordinate system") with a known origin on the pattern page, e.g., its upper left corner. As shown in FIG. 8, every document page 18 may likewise be associated with a local coordinate system 18' ("paper coordinate system") with a known origin on the document page, e.g., its upper left corner. In one embodiment of FIG. 8, there is, by convention, a known and fixed relation between these coordinate systems 14', 18' such that the pattern page 14 completely overlaps the associated document page 18. In the example of FIG. 8, the origin of the paper coordinate system 18' can be expressed as a pair of non-negative x,y coordinates in the pattern page coordinate system 14'. Using this convention, the document page 18 is thus conceptually superimposed on the pattern page 14 in a known way. By further convention, a selected subset of the pattern page (pattern area 19) is placed on the document page 18 at its overlapping location. Thus, by specifying a pattern area 19 (in the pattern page coordinate system 14'), its location on the document page 18 (in the paper coordinate system 18') is automatically given. Vice versa, the pattern area 19 may be automatically known for any region specified on a document page 18 (in the paper coordinate system 18'). Conceptually, this can be compared to a "Christmas calendar", in which hinged doors in a cover sheet can be opened to reveal a hidden underlying sheet. When a region is defined on the document page 18, the underlying pattern (pattern area 19) may be revealed.

Clearly, only a small amount of data is required to specify pattern areas 19 on document pages 18, resulting in a reduced size of the AFD file. For example, it is sufficient to define the location of a region on the document page; its content of pattern is known by convention.

In one embodiment, the system developer/deployer may only be exposed to one of the paper coordinate system 18' and the pattern page coordinate system 14'. Thus, the location and size of active areas and graphical elements may all be defined in one of these coordinate systems. Likewise, digital pens will output position data given in this coordinate system. In another embodiment, the developer/deployer may be exposed to the paper coordinate system 18', again to enhance the analogy between the physical and digital worlds. The location of a graphical element as given in the AFD file, will thus match the location of the graphical element on the printed product. In this embodiment, the digital pen may convert positions in the pattern page coordinate system 14' to positions in the paper coordinate system 18', which is done by a simple linear coordinate shift.

The use of a known linear shift between pattern page 14 and document page 18 makes it easy to visualize (display) recorded position data against a background image representing the visual appearance of the document page. If necessary, the background image is scaled to match the size of the document page, whereupon position data given in the paper coordinate system 18' can be directly rendered on the background image. Position data given in the pattern page coordinate system 14' is first transformed to the paper coordinate system 18' by a linear coordinate shift. Thus, pen strokes can be visualized in their proper context without requiring extensive processing, which may allow its use on small handheld device with limited processing power. Low-resolution background image(s) for display may be generated and stored in the AFD file by any one of the Paper Design Tool 60, Paper Activation Tool 61 and Paper Print Tool 62 shown in FIG. 6.

5.3. Extensions

The platform may include features to extend the page mapping functionality.

One such feature is a parameter (has_pattern), which is associated with each document page to indicate whether the document page should be associated with a pattern page or not. The parameter value may thus cause the mapping logic to skip this document page when mapping document pages to pattern pages. Subsequently, this document page will be printed without any pattern. This feature may ensure that pattern need only be applied to document pages where it is useful, to avoid wasting pattern pages. For example, a cover page with introductory information about the rest of the document might not need to be provided with position-coding pattern. In the example of FIG. 9, the AFD file defines a five-page document, with a cover page to be printed without pattern. The AFD file is activated with 10 pattern pages. Printing of two copies results in two tangible five-page copies, while still leaving two pattern pages for later use in the AFD file.

For reasons of AFD file size, the has_pattern parameter may be set for each document page, as in the above examples, to be applicable to all instances of a certain document page. However, in an alternative embodiment, individual page instances may be associated with the has_pattern parameter.

Another mapping feature is a reserved page. This is an empty document page which is mapped against a pattern page but is not printed. A reserved page may be used as padding at the end of a document. FIG. 10 illustrates an example in which an AFD file defines a four-page document, of which the last page is a reserved page R. Printing of two copies results in two tangible three-page copies.

Reserved pages may be used, for example, to update an existing document (AFD file) by adding document pages to be printed with pattern. In the absence of reserved pages, it may not be possible to add a document page to be printed with pattern to an existing AFD file, since this would change the mapping between document pages and pattern pages. This is due to the fact that the page mapping logic is based on dead reckoning from a starting page address, document page by document page and copy by copy. If the document (AFD file) is provided with one or more reserved pages, such a reserved page can be converted to a document page to be printed with pattern without disturbing the existing mapping between document pages and pattern pages.

In another example, reserved pages are used to make sure that each copy of all documents in a system occupies the same number of pattern pages. This may be useful in a print-on-demand (PoD) system, in which many different documents can be printed with position-coding pattern on digital printers, and digital pens are configured to collate the recorded data by document copy. To avoid downloading information about the pattern pages of all document copies in the digital pens, at least part of the position-coding pattern may be partitioned into ranges of pattern pages (PA ranges), with each range being intended for a document copy. Information about this partitioning can be stored in the digital pens, which thus are capable of collating the recorded data within the respective range. To ensure that the mapping logic causes each document copy to occupy a full PA range, reserved pages can be added, as needed, to each AFD file.

In one embodiment, the reserved page R is implemented as a simple number designation in the AFD file, e.g., an nr_of__reserved pages parameter indicating the number of pages to be added at the end of the document or a total_number_of__pages parameter indicating the size of the aforesaid range. The number designation allows the mapping logic to allocate the appropriate number of pattern pages for each document.

Still another mapping feature is a virtual page. The virtual page may be mapped against a pattern page but is not printed as a separate page. The virtual page is thus similar to a reserved page, but is implemented in a less space-efficient manner and has more versatile use. A virtual page can be added anywhere in the document, and it is implemented as regular document page. It can thus have pattern areas, human-understandable graphics, active areas, resources, etc. Although a virtual page cannot be printed as a separate document page, it can be printed as part of another document page. For example, as indicated in FIG. 11, a part on the virtual page V may be defined as a pattern area 19 using the above-mentioned layout mapping ("Christmas calendar"), and this section may be referenced by a (non-virtual) document page to be "pasted" onto this document page at a specific location (e.g. given in the paper coordinate system). Such a pasted part will be printed as a non-transparent element that covers any elements of this document page, such as pattern area, graphics, etc. In the example of FIG. 11, printing of two copies results in two tangible three-page copies, of which the pattern area 19 from the virtual page V has been inserted on the first and second pages of each copy. The inserted pattern area 19 contains pattern from the pattern pages mapped to the virtual page (i.e. page address 3002 and 3006, respectively). Thus, in this example, a virtual page is used as a container of pattern areas that can be pasted onto the pages to be printed. The position data recorded from the printed document will be stored as generated data in association with the virtual page.

6. AFD FORMAT 6.1. Storage Sections

An embodiment of the AFD format, implemented as an archive file, is schematically depicted in FIG. 12, in which different data storage sections are indicated within brackets for ease of understanding.

The GENERAL section may include three XML files in the top folder of the AFD file: main.info, main.document and main.pattern. The info file contains global data (metadata) about the AFD file, which may be selectively extracted from the AFD file for simplified processing on the platform, e.g. for locating a proper AFD file among a plurality of AFD files, for routing the AFD file to a proper destination, etc. The document file includes document data (metadata) which is used when accessing data in other data storage sections of the AFD file, typically in reading, writing or mapping operations. The pattern file includes basic page mapping data. It is thus realized that the pattern file is updated whenever pattern licenses are added to the AFD file.

The PATTERN section may include a licenses folder for holding one or more pattern license files. Each license file is identified by its starting page address and its level. Recalling that sublicenses can only be granted within the range of pattern pages of a license, it should be realized that if two pattern licenses share the same starting page address, they should belong to the same license chain, i.e., they should have different values of their level parameter. Thus, the combination of starting page address and level can be used to uniquely identify each pattern license file.

The STATIC section, which holds static page specifications, includes a pages folder which has a subfolder for each page of the document, given by page number (page#). Each such subfolder can hold an area collection, given by a page.areas file, a graphics collection, given by a page.gfx file, and one or more property collections. Different file extensions (suffix) are used to distinguish different property collections from each other. The area collection defines active areas (given by areaIDs), i.e. areas to be used by the processing application (or the digital pen if the AFD file is available to the pen, see further below). The graphics collection defines or identifies graphical elements that collectively form the visible layout of the page. Each property collection is used to associate a specific property to the active areas defined by the areas file. Specifically, the property collection associates a set of areaIDs with data strings. A property collection could be used to associate the active areas on a page with area names, character-recognition types (number, character, email, phone number, etc), audio file names, function calls, pen feedback vibration types (one thump, double thump, etc).

The DYNAMIC section, which holds dynamic page specifications, is organized similarly to the STATIC section and stores corresponding data. Specifically, this may include an instances subfolder to the pages folder, which can hold an area collection, a graphics collection and one or more property collections for each instance. Each such collection is given a file name that identifies the relevant instance, given by copy number (copy#) and page number (page#).

The RESOURCES section may include a resources subfolder to the pages folder. The resources subfolder can hold any type of file which is either common to the document or is referenced in the static or dynamic page specifications. Such resources may include background images of different resolution to be used when displaying recorded position data, audio files, image files depicting a respective graphical element, an originating document file such as a word-processing document, a PDF file, a presentation document, a spreadsheet document, etc.

The GENERATED DATA section may include a data folder, which holds all data generated in connection with the document as printed. Recorded position data is stored as time-stamped pen strokes. In the illustrated example, the pen strokes may be stored in a proprietary .sff file format, and with a file name that indicates the time range for the included pen strokes, i.e., the earliest and latest time stamps in the file. This name convention is used to facilitate temporal mapping, i.e., to make it easy to quickly find pen strokes based on their recording time.

The pen strokes may be stored in a structure of subfolders, and may be sorted by page address and penID. The page address thus identifies the pattern page from which the pen strokes were recorded, and the penID identifies the digital pen that recorded the pen strokes. In contrast to other parts of the AFD file, pen strokes may be associated with their originating page address instead of instance (copy#, page#). The page address is unique within the entire system, whereas the instance is only unique within a particular AFD file. If pen strokes are associated with page address they can easily be transferred between different AFD files. Furthermore, as will be described below, it might be desirable for digital pens to use the AFD format as a container of pen strokes. Generally, the digital pen has no information about the page mapping for a particular document, and is thus unable to store the pen strokes based on instance.

Other generated data may also be stored in the data folder, or in an appropriate subfolder, possibly with a file name that identifies the time range, and possibly with a file extension that identifies the type of data. Such generated data may include a picture taken by the pen or by an accessory device in connection with the printed document, an audio file recorded in connection with the printed document, bar code data recorded in connection with the printed document, text resulting from handwriting recognition (HWR) processing of pen strokes, etc.

Thanks to the convention of naming these files of generated data, different data files that may be recorded simultaneously or within the same time frame may be associated to each other. The strokes and other data that may be recorded with the same time range have file names containing an identifier of this time range. Thus, the associated files may be easily detected. This may allow a sound recorded in connection with a specific stroke to be easily found and played or a place where the stroke was made to be easily determined by a recorded GPS position.

6.2. Sample Parameters

FIGS. 13-18 illustrate sample parameters of the different files included in the AFD format, according to an embodiment. Most parameters have self-explanatory names and will not be explained further. However, the definition and use of certain parameters will be explained in more detail in the following.

FIG. 13 illustrates parameters of a main.info file.

The GUID parameter is a globally unique, or essentially unique, identifier of the AFD file. The GUID may serve several purposes. For example, it may be used as index to expediently locate a particular AFD file in a database. As will be explained below, it may also be used for version control and to check the integrity of the AFD file. Furthermore, if the digital pens output recorded data in the form of an AFD file, the GUID could be used in conveying the AFD file to its appropriate processing application.

The GUID may be added to the AFD file when the file is "locked", e.g. when the invariant page layout has been finalized, e.g. using the Paper Design Tool, and the corresponding layout data is stored as static page specifications in the AFD file. In one embodiment, the GUID is generated as a random number. In another embodiment, it is generated as a fingerprint of at least part of the AFD file. Any subsequent changes to the static page specifications in the AFD file may require unlocking of the file and results in a new value of the GUID. Thereby, the GUID may be used for version control.

However, it should be noted that the GUID may be not affected when the AFD file is updated with pattern licenses and generated data. The GUID may likewise be unaffected by changes to the dynamic page specifications in the AFD file.

In one embodiment, the GUID may be generated as a function of the static page specifications in the AFD file, e.g. by operating a hash function on this data. Thereby, the integrity of this data may be checked anywhere within the platform, by operating the hash function on the content of the static page specifications and comparing the resulting hash value to the GUID. Suitably, the hash function is dependent both on content and on the order of content, to ensure that different GUID values are generated if, e.g., one parameter value is changed from 0 to 1 and another parameter value is changed from 1 to 0. Such a hash function may be implemented as a CRC (cyclic redundancy check).

The target_uri parameter is a routing information identifier. It may implicitly or explicitly identify a destination address for the AFD file, or data therein. The destination address may indicate the address of a processing application for final processing of the AFD file (e.g. a network address of the computer/server in FIG. 6), or it may indicate the network address of a routing or forwarding service for conveying the AFD file to the processing application.

The pageaddress_start and pageaddress_stop parameters indicate the lowest and highest page address, respectively, given by the pattern license(s) in the AFD file. Thus, these parameters define the maximum page address range (PA range) of the AFD file and may be used for rejection testing among a plurality of AFD files, based on a page address. For example, a processing application may map page address(es) of received position data against the maximum PA range to find candidate AFD files to be used in processing the position data. It is to be noted that for final acceptance, it is necessary to identify the PA range of each individual pattern license in the candidate AFD files and map the received position data against these PA ranges. This is due to the fact that each AFD file may include pattern licenses with quite different PA ranges, causing discontinuities in maximum PA range given by the pageaddress_start and pageaddress_stop parameters.

The procedure of examining individual pattern licenses in a plurality of different AFD files may be rather processing intensive and time consuming. A preceding coarse rejection test, based on the maximum PA range of each AFD file, may allow to eliminate irrelevant AFD files from further examination.

The current_copy parameter identifies the next copy to be printed and is used in the page mapping procedure, as described above.

The total_number of copies parameter identifies the total number of copies that can be printed using the pattern licenses in the AFD file.

FIG. 14 illustrates parameters of a main.document file. The locked parameter indicates whether the AFD file has been locked or not, indicating that part of the AFD file no longer can be changed. As indicated above, this part may be the static page specifications, or both the static and dynamic page specifications, depending on implementation. The pattern_ref parameter identifies the pattern file (typically main.pattern) to be used when mapping pattern pages to the document. The nr_of_reserved_pages parameter identifies the number of reserved pages, as explained above. The page_basepath parameter identifies for each document page (Page#:0 ... n) the file name of the relevant static area collection (areasfile_ref), the file name of the relevant static graphics collection (gfxfile_ref), the width of the page (width), the height of the page (height) and if the page consumes pattern (has_pattern). By default, areasfile_ref and gfxfile_ref are set, for each document page, to indicate the static area and graphics collections that are stored in the subfolder structure of the pages folder. When a document contains several document pages with identical area and/or graphics collections, the areasfile_ref and gfxfile_ref may be set to share one area and/or graphics collection between these document pages, to thereby reduce the size of the AFD file. This may be relevant, for example, in an AFD file representing a notebook that contains a plurality of document pages that are identical but for their pattern.

FIG. 15A illustrates parameters of a license file. The level parameter indicates the sub-licensing level, as explained above. The width parameter identifies the width of the pattern pages of the pattern license. The height parameter identifies the height of the pattern pages of the pattern license. The pageaddress_start parameter identifies the first pattern page in the PA range of the pattern license. The pageaddress_stop parameter identifies the last pattern page of the PA range of the pattern license. The permissions parameter indicates the functionality permissions given by the pattern license, as explained above. The signature parameter includes a digital signature of the license file, or part thereof and is used for verifying that the license is authentic and has not been tampered with. The public key parameter includes a license key to be used in verifying any sublicenses given from the present pattern license. The structure and use of license files are further described in Assignee's PCT application No. PCT/SE2008/050314, which is incorporated herein by reference.

Figures 15B, 16A, 16B:
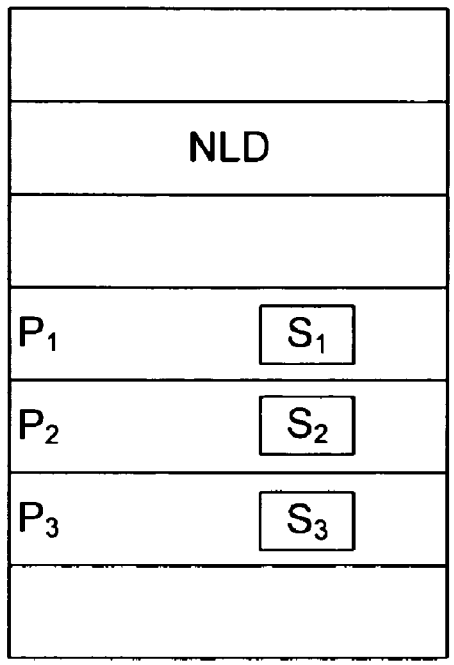

A digital signature may also be used to exclusively tie the pattern license to the AFD file. In one such embodiment, a digital signature ("tying signature") is generated on license data (the license file(s), or part thereof) in combination with non-license data from the AFD file. Such non-license data may include all or part of the static page specification in the AFD file. The resulting tying signature is added to the AFD file, so as to interweave the pattern license with the AFD file. FIG. 15B illustrates one embodiment of an AFD file, in which a tying signature S1-S3 is included in each of the pattern licenses P1-P3 to exclusively associate the respective pattern license P1-P3 with non-license data NLD in the AFD file.

In one embodiment, the License Manager API provides a function for generating a digital signature based on a license file, and setting the signature parameter in the license file equal to the digital signature. To use such a function, the non-license data is first added to the license file, which is then subjected to the signature-generating API function.

The tying signature may be generated by the Paper Activation Tool (FIG. 6) before it adds the pattern license to the AFD file. In one example, the tying signature is calculated by operating a hash function on the license and non-license data and using a private key of an asymmetric key pair to encrypt the resulting hash value.

The Paper Print Tool (FIG. 6) may be required to verify the included pattern license(s) before printing an AFD file. Using the above example, this verification may include extracting the hash value by decrypting the tying signature in the AFD file, using a public key of the asymmetric key pair, and re-recalculating the hash value by operating the hash function on the license and non-license data. If the extracted and recalculated hash values match, the verification succeeds, otherwise it fails.

In one embodiment, the GUID parameter in main.info in the AFD file may be used as non-license data. This may provide processing efficiency. Furthermore, only a small amount of data may be added to the license file in order to use the signature-generating API function of the License Manager. The verification of such a license file includes extracting the hash value by decrypting the tying signature in the license file, and re-recalculating the hash value by operating the hash function on the content of the license file. If the extracted and recalculated hash values do not match, the verification fails. Otherwise, it proceeds by recalculating the GUID based on the content of the AFD file (recalling that the GUID might be generated as a fingerprint of AFD file content) and by checking that this re-calculated GUID matches the GUID in the license file. By using a re-calculated GUID instead of the GUID in main.info, an illicit user is prevented from circumventing the verification by copying both a pattern license and a GUID from one AFD file to another AFD file.

FIG. 16A illustrates parameters of a main.pattern file. The start_pa parameter identifies the starting page address for each PA range given by the pattern license(s) in the AFD file. The copies parameter identifies the maximum possible number of copies that can be printed using each such PA range. Whenever a pattern license is added to the AFD file, the Document Module adds the included PA ranges to the list in main.pattern, in the form of start_pa and copies. The order of entries in main.pattern defines aforesaid mapping order of PA ranges.

By including the size of each PA range (given by the copies parameter) in main.pattern, the page mapping logic can operate solely on metadata, i.e., without having to access the individual pattern licenses. This may save processing power and reduce processing time. There are alternative ways of including the size of the PA range in the metadata, e.g. by identifying the number of pattern pages for each PA range or by identifying the last page address in each PA range.

To further exemplify the use of main.pattern, consider an AFD file that defines four document pages. The AFD file has been activated for 9 copies, by adding a pattern license that defines two PA ranges: one starting at PA=10 and spanning 7 copies, and one starting at PA=100 and spanning 2 copies. The resulting content of main.pattern is shown in FIG. 16B. The page mapping logic causes pattern pages to be mapped to page instances in the following order, with brackets indicating separate copies: [10, 11, 12, 13], [14, 15, 16, 17], [18, 19, 20, 21], [22, 23, 24, 25], [26, 27, 28, 29], [30, 31, 32, 33], [34, 35, 36, 37], [100, 101, 102, 103], [104, 105, 106, 107].

This AFD file is later activated with pattern for one more copy, by another pattern license being added to the AFD file. This pattern license defines a PA range starting at PA=200 and spanning 1 copy. The resulting content of main.pattern is shown in FIG. 16C. Based on this content, the resulting page mapping is: [10, 11, 12, 13], [14, 15, 16, 17], [18, 19, 20, 21], [22, 23, 24, 25], [26, 27, 28, 29], [30, 31, 32, 33], [34, 35, 36, 37], [100, 101, 102, 103], [104, 105, 106, 107], [200, 201, 202, 203].

As shown in FIG. 17, the page.areas file may contain definitions of any number of two-dimensional active areas on a document page or instance. Each active area is identified by an areaID which is unique within the page/instance but need not be unique within the document. Each areaID is associated with an indication of one of a plurality of available geometric shapes (such as rectangle, circle, right-angled triangle, isosceles, star, ellipse, etc). Each such shape is further defined by a set of x,y coordinates. The x,y coordinates may define the location, size, and optionally shape parameters of the respective shape on the page/instance.

As shown in FIG. 18, the page.gfx file may contain definitions of any number of graphical elements using a default setting on scale and color. Each graphical element may be identified by an elementID that is unique within the page/instance but need not be unique within the document. Each elementID may be associated with an indication of one of a plurality of available graphics types. In the embodiment of FIG. 18, these types include image, text, pattern area, scale, and color. Each such type is further defined by a set of graphics parameters. An image may be defined by a resource source path (indicating an image definition/file in the AFD file or elsewhere, optionally supplemented by an indication of a specific page in the image file), a location (x,y coordinates), a width and a height. A text may be defined by text string, a location (x,y coordinates), a font, an angle and a size. A pattern area may be defined by a location (x,y coordinates), a width and a height. The scale parameter defines the measurement units in which a location is given, e.g. in millimeters, inches, or a proprietary pattern unit (default). In one embodiment, one proprietary pattern unit (Anoto Unit, AU) corresponds to 0.3/8 mm. A color may be defined by control values (fractions) for primary colors, e.g. red (r), green (g) and blue (b).

In one embodiment, a pattern area may be imported from an external AFD file. Such a pattern area is defined in page.gfx by a source path (indicating the external AFD file), a copy#, a page#, an elementID, and a location (x,y coordinates). Such a definition may cause a Paper Print Tool to open the external AFD file, apply the page mapping logic to identify the pattern page associated with the relevant instance (given by the copy# and page#) in the external AFD file, retrieve the definition (location, width, height) of the given elementID in the static graphics collection for the given page# in the external AFD file, generate the pattern area based on this definition (using the layout mapping logic), and place the pattern area at the given location.

In one embodiment, a graphical element may be connected ("autolinked") to an active area included in the same static or dynamic page specification. In one such implementation, a graphical element ("image", "text" and "pattern area" in FIG. 18) has the option of being defined by an areaID. Thus, by specifying an areaID as a graphics parameter for a graphical element, the Document Module may automatically adjust the location, width and height of the graphical element to the location, width and height of the area given by the areaID. By utilizing this feature in a Paper Design Tool or Paper Activation Tool, it is ensured that a graphical element follows an active area if it is resized or moved. Likewise, if an areaID is found as a graphics parameter in a graphics collection, the Paper Print Tool automatically loads the corresponding area collection and sets the location, width and height of the graphical element to the location, width and height of the bounding box around the relevant area.

7. EXEMPLIFYING AFD FILE CONTENT

To further facilitate the understanding of the structure of the AFD format,

FIG. 19 illustrates the content of a non-activated AFD file (form1.aft) for a two-page document created by a Paper Design Tool (FIG. 6). As shown, the file includes metadata (main.info & main.document), as well as a static area collection and a static graphics collection for each of page#0 and page#1. The AFD file further includes a printable layout for each page, i.e., a file that represents all human-understandable information of the document page (thus, excluding pattern).

Figures 20B, 21:
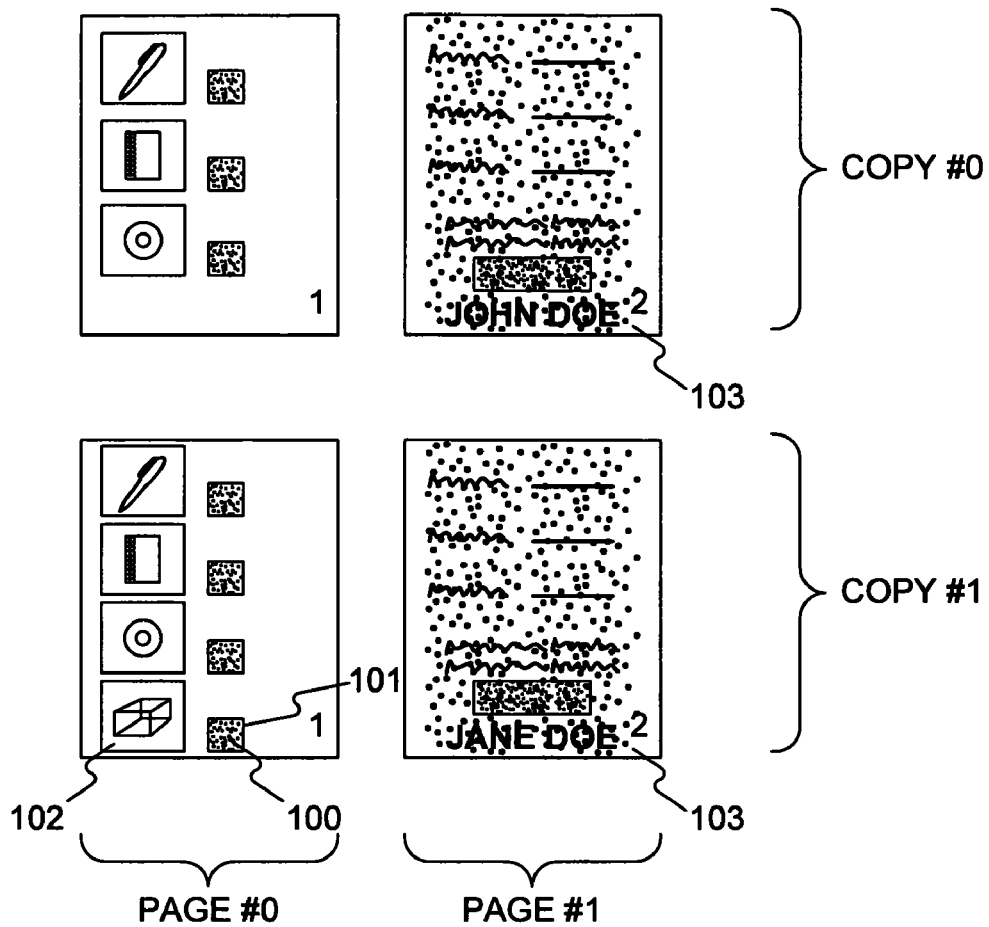
FIG. 20B is an exemplary view of position-coded products resulting from the AFD file in FIG. 20A.
FIG. 21 is an example of the content of a pen data file based on the AFD format.

FIG. 20A illustrates the AFD file (form1.afd) resulting from an activation of the AFD file in FIG. 19 (form1.aft) with a pattern license (3000_3.license), and addition of a dynamic page specification in the form of an area collection for page#0 of copy#1 (c1p0.areas) and graphics collections for certain instances (c0p1.gfx, c1p0.gfx, c1p1.gfx). This AFD file may, e.g., represent a two-page order form for digital pen products. FIG. 20B illustrates an example of the two copies as printed. In this example the dynamic area collection defines a checkbox area which is added to page#0 of copy#1. The dynamic graphics collections include a definition of a pattern area for the checkbox 100 on page#0 of copy#1, an indication of a checkbox icon (e.g. a frame 101) to be placed in alignment with the pattern area on page#0 of copy#1, an indication of a product image 102 to be placed on page#0 of copy#1 next to the checkbox, as well as a text element 103 indicating a first signatory on page#1 of copy#0 (John Doe) and a second signatory on page#1 of copy#1 (Jane Doe).

FIG. 21 illustrates the content of an AFD file containing pen data (pen.afs). The file contains metadata as well as a pen stroke file (.stf) for each of two different page addresses, with the file name indicating the time range in utf8-coded hexadecimal format with prefix 0x.

FIG. 22 illustrates an example of main.info in the AFD file of FIG. 20A. In the example, form1.afd is activated with pattern licenses for 2 copies (total_nr_of_copies), of which all remain to be printed (currentcopy. 0).

FIG. 23 illustrates an example of main.document in the AFD file of FIG. 20A. The AFD file is locked, and the page mapping data is indicated to be found in main.pattern (via the pattern_ref parameter). The file may also indicate the location of the static area and graphics collections for each document page in the AFD file, as well as the size of each document page (given in AU) and that it is to be printed with pattern (has_pattern="1").

FIG. 24 illustrates an example of main.pattern in the AFD file of FIG. 20A. The page mapping should start at page address 3000 (start_pa), and the AFD file is provided with a pattern license sufficient for 2 copies.

FIG. 25 illustrates an area collection defined by a page.areas file. It defines two active areas. AreaID=0 is an oval (shape="Ellipse") inscribed by a rectangular bounding box having upper left corner coordinates (400,400) and lower right corner coordinates (480,560), given in AU. AreaID=1 is a rectangle (shape="Rect") having upper left corner coordinates (352,352) and lower right corner coordinates (440,440), given in AU.

FIG. 26 illustrates a graphics collection defined by a page.gfx file. ElementID=0 is given in millimeters and defines a rectangular pattern area of 50×50 mm located at the upper left corner of the page. ElementID=1 is black (r=0 µg=0,b=0) and defines the text "This is the first page" in font CourierStd with font size 32. The text is located beneath the right corner of the pattern area, at coordinates (50,50), given in millimeters. ElementID=2 is an image, found on the first page of a PDF file located in the resources folder, to be placed at coordinates (10,10) scaled to a size of 100×100 mm.

8. DOCUMENT MODULE OPERATION

In the following, the use of the Document Module of FIG. 3B will be further described in the context of the exemplifying system implementation of FIG. 6. Where appropriate, specific reference will be given to parameters used in the AFD file format implementation of FIGS. 12-18, as well as to the exemplifying AFD file content illustrated in FIGS. 19-26. The illustrated processes may be implemented by calling functions available through the Document API of the Document Module, and possibly by functions available through the APIs of the License Module and Print Module, as indicated below. It is to be understood that all processes are mere examples. Thus, steps may be added, removed or effected in different order.

8.1. Generating an AFD File

Figure 27:
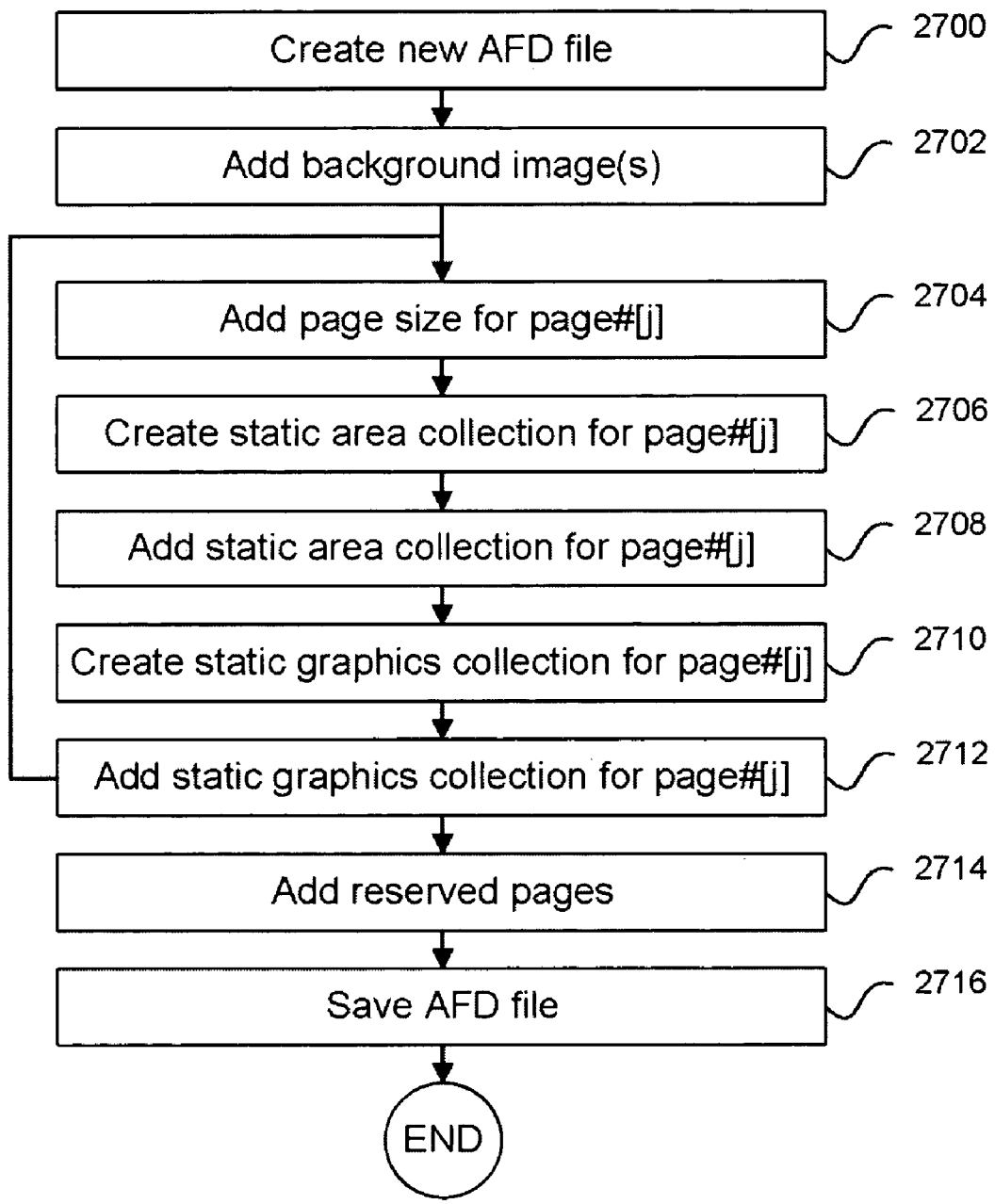
FIG. 27 illustrates an exemplary process for using the Document Module in generating an AFD file.

FIG. 27 illustrates an exemplifying process for generating an AFD file. The process may be executed in the Paper Design Tool (FIG. 6) which may provide a Graphical User Interface (GUI) for designing a document and creating an AFD file. In the example of FIG. 27, a new AFD file is created, step 2700. In step 2702, one or more layout images are added as resources to the AFD file to represent the human-understandable graphics for each page of the document (cf. layoutpageo.eps and layoutpagel.eps in FIG. 19). Then, in step 2704, the size of the first page is specified in the AFD file (width, height in main.document in FIG. 14), whereupon a static area collection is created for the first page, step 2706, and added to the AFD file as pages/O/page.areas (step 2708). A reference to the static area collection is also added to the GENERAL section of the AFD file (areasfile_ref in main.document). Similarly, a static graphics collection is created for the first page, step 2710, and added to the AFD file as pages/O/page.gfx (step 2712). A reference to the static graphics collection is also added to the GENERAL section of the AFD file (gfxfile_ref in main.document). The graphics collection defines, i.a., the placement of one or more of the layout images on the page. The AFD file may also be provided with an indication whether the page should be printed with pattern or not (has_pattern in main.document). Steps 2704-2712 are then repeated for each page of the document. However, reserved pages are treated separately, since they do not have neither size nor page specifications. Thus, a number of reserved pages for the form may be added in step 2714 (nr_of_reserved_pages in main.document). The AFD file is then saved, step 2716. Before saving, the AFD file may be locked to indicate that the static page specifications of the AFD file are finalized (locked in main.document). As mentioned above, this may also cause the Document Module to generate a unique ID for the AFD file (GUID in main.info). The process may also involve specifying a destination address (target_uri in main.info).

The process of FIG. 27 is equally applicable when an existing non-activated AFD file is to be amended. If the existing AFD file is locked, the process may either prevent amendments to the static page specifications, require some kind of authorisation, or at least issue a warning.

8.2. Activating an AFD File

Figure 28:
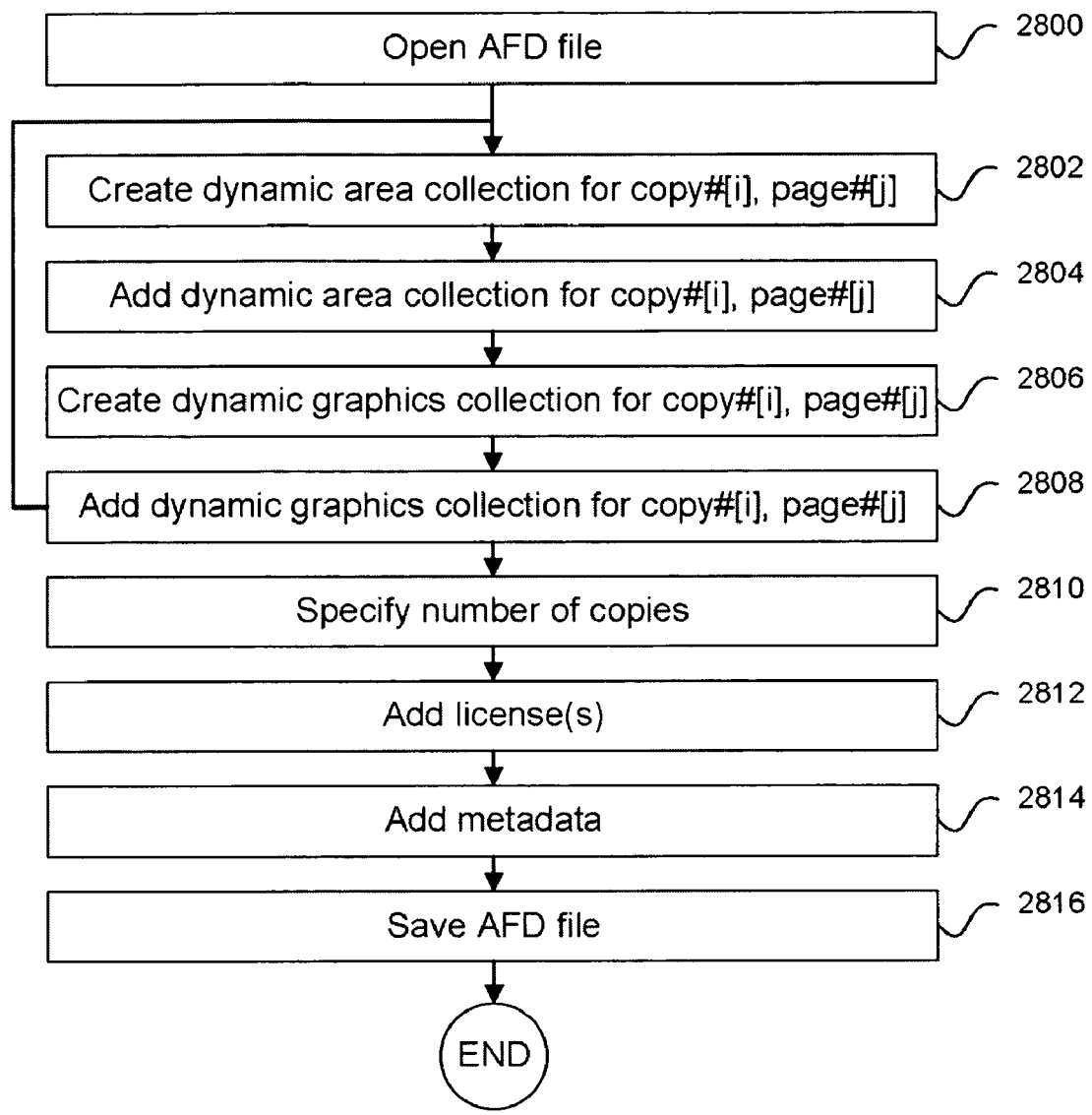
FIG. 28 illustrates an exemplary process for using the Document Module in activating an AFD file.

FIG. 28 illustrates an exemplifying process for activating an AFD file. The process may be executed in the Paper Activation Tool (FIG. 6). In the example of FIG. 28, an AFD file is opened, step 2800. Then, a dynamic area collection may be created for a specific instance (identified by copy#, page#), step 2802, and added to the AFD file as pages/instances/c<copy#>p.areas (step 2804). Similarly, a dynamic graphics collection may be created for a specific instance, step 2806, and added to the AFD file as pages/instances/c<copy#>p.gfx (step 2808). Steps 2802-2808 may be repeated for other instances. Then, the AFD file is activated for a selected number of copies, step 2810. In this step, the Document Module may calculate the required number of pattern pages, using metadata in main.document (number of document pages with pattern, and number of reserved pages). The Paper Activation Tool may then use the License API of the License Module (FIG. 3D) to obtain an appropriate pattern license, i.e., one or more pattern licenses that collectively contain a sufficient number of pattern pages (with adequate width, height, functionality permissions, etc). The License Module may also be used to verify the authenticity and integrity of the pattern license(s). The pattern license(s) are then added to the licenses subfolder of the AFD file, step 2812. Suitably, tying data is added to the AFD file to tie the pattern license(s) to the AFD file. Metadata is also added to the AFD file, step 2814. Specifically, pageaddress_start and pageaddress_stop (main.info) are set to indicate the total PA range spanned by the pattern license(s) in the AFD file, totalnr of copies (main.info) is set to indicate the activated number of copies, and current_copy (main.info) is set to 0 to indicate that all copies remain to be printed. Furthermore, a main.pattern file is added to the AFD file, and is referenced by pattern_ref in main.document. The added main.pattern file includes an ordered list of the PA ranges that are defined in the pattern license(s), with each PA range being given by start_pa and copies. Suitably, all or at least part of this metadata is automatically added by the Document Module to the AFD file upon addition of the pattern license(s). The AFD file is then saved, step 2816. The unique ID (GUID) remains unchanged since the static page specifications are unaltered.

The process of FIG. 28 may be applicable when an existing activated AFD file is to be further activated for a selected number of additional copies. Again the Document Module may be operated to calculate the required number of pattern pages, and to add corresponding pattern license(s) to the AFD file. Dynamic page specifications may also be created and added for newly activated instances (given by copy#, page#).

8.3. Printing an Activated AFD File

Figure 29:
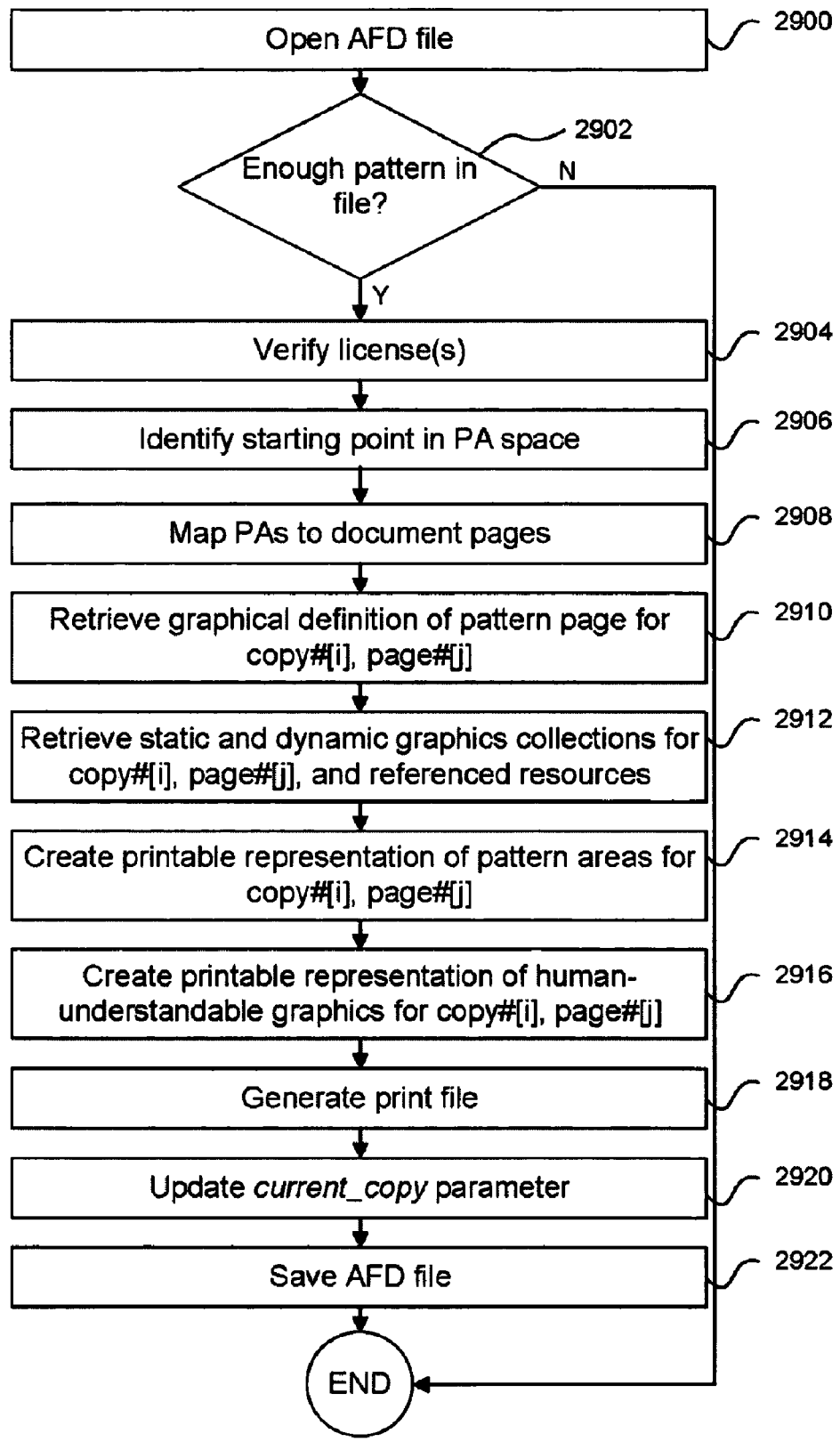
FIG. 29 illustrates an exemplary process for using the Document Module in printing an AFD file.

FIG. 29 illustrates an exemplifying process for printing an activated AFD file. The process may be executed in the Paper Print Tool (FIG. 6). First, the AFD file is opened, step 2900. It is then examined if the AFD file is activated with a sufficient number of pattern pages, step 2902, suitably by checking if the requested number of copies to be printed is less or equal to the number of remaining copies in the AFD file, given by metadata in main.info (total_nr_of_copies−current_copy). If not, the printing process is terminated, and the AFD file will have to be activated with more pattern pages. This check may performed by the Document Module upon receipt of the request for a number of copies. The process may then use the License Module to verify the authenticity and integrity of the license file(s) in the AFD file, as well as checking that the pattern license(s) can be used for printing (i.e., that permissions of each license includes "print"), step 2904. The process may also check the tying data in the AFD file to verify that each pattern license is appropriately tied to the AFD file, e.g. by evaluating a digital signature in the AFD file as described above.

The process then identifies a starting point for the page mapping in PA space, based on the ordered list of the PA ranges in main.pattern and the number of previously printed copies (given by current_copy in main.info), step 2906. The starting point will indicate the first available page address in a specific PA range. Then, in step 2908, the process maps page addresses to document pages, by dead-reckoning from the starting point in PA space. If the number of copies in the PA range is insufficient, the process will continue mapping pattern pages from the next PA range listed in main.pattern. The page mapping thus results in one page address being allocated to each document page. After the page mapping, the process retrieves code symbol graphics for each pattern page, step 2910, for example by querying a pattern generation function (PGM in FIG. 3C) based on page address. The process also retrieves the static and dynamic graphics collections, as well as any resources referenced therein, from the AFD file, step 2912. The process then generates the pattern areas for each instance (using the above-described layout mapping), and creates a printable representation of the generated pattern areas, using the Print Module, step 2914. Similarly, the process creates a printable representation of human-understandable graphics for each instance, using the Print Module, step 2916. These representations may then be combined in a print file, using the Print Module, step 2918. Before saving the AFD file (step 2922), the process updates current copyto specify the copy# of the next copy to be printed, step 2920. Step 2920 may be automatically carried out by the Document Module any time after receiving the request for a number of copies, provided that steps 2902 and 2904 succeed.

8.4. Processing a Pen Data File

Figure 30:
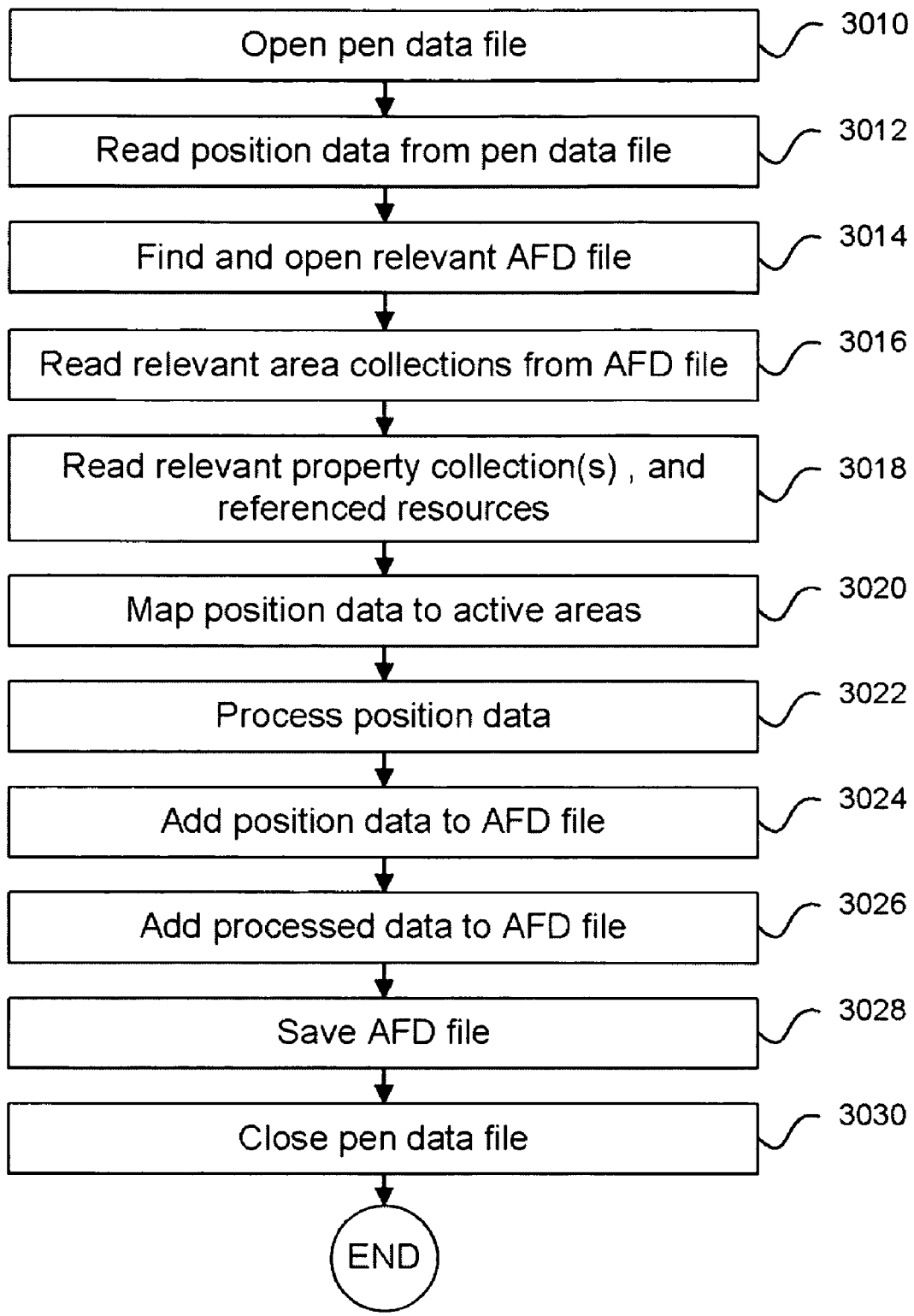
FIG. 30 illustrates an exemplary process for using the Document Module in processing of pen data.

FIG. 30 illustrates an exemplifying process for processing a pen data file (.afs file) using an activated AFD file. The process may be executed by a forms processing application on the computer/server in FIG. 6. First, the pen data file is opened, step 3010, and its position data retrieved, step 3012. The position data is associated with one or more page addresses, which may be used to locate the relevant AFD file in the repository, step 3014. As described above, this step may involve a rejection test based on the pageaddress_start and pageaddress_stop in main.info, and a final acceptance test by mapping the received position data against the license file(s) in the AFD file. When the AFD file has been located, the process may read the corresponding area collection(s) from the AFD file, step 3016. This may involve converting each page address to a corresponding instance (copy#, page#) and identifying its static and dynamic area collections (if any). The process may also read one or more property collections associated with the instance, and any resources referenced by the property collections, step 3018. Then, the process is ready to map the position data against active areas, step 3020, and to process the position data using properties and resources associated with the active areas, step 3022. After the processing, the position data may be added to the AFD file as generated data, step 3024. Similarly, the result of the processing may also be added to the AFD file as generated data, step 3026. Alternatively or additionally, the processed data is stored as such in a database, displayed, forwarded or otherwise handled for information management.

Finally, the AFD file is saved, step 3028, and the pen data file is closed, step 3030. If dynamic page specifications have been added to the AFD file by the Paper Print Tool (FIG. 6), the forms processing application may need to access the thus-updated AFD file, in order to be able to process the pen data file. In such a scenario, the Paper Print Tool may store activated AFD files in a repository which is available to the forms processing application.

9. PRINT-ON-DEMAND SYSTEM

Figure 31:
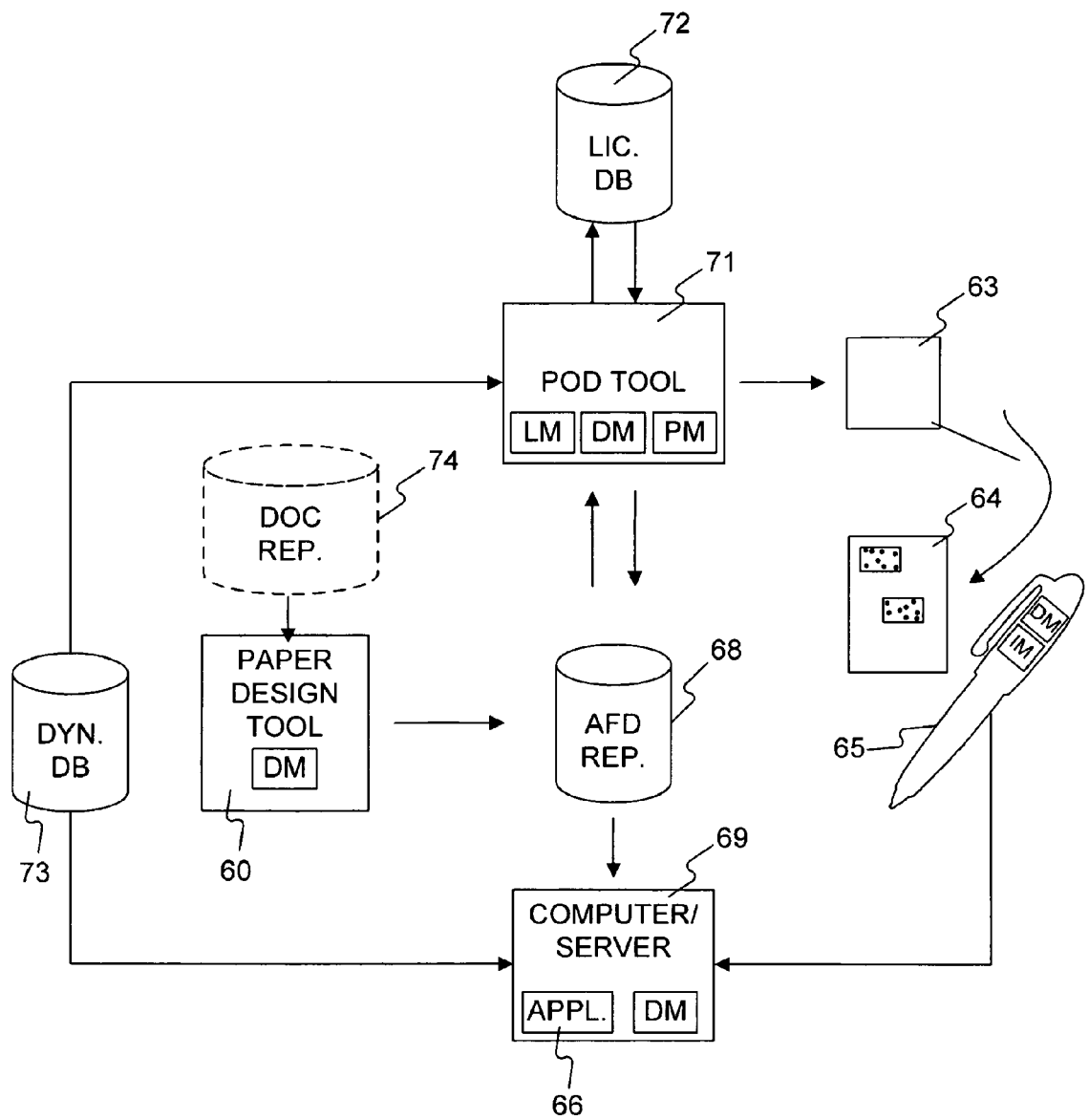
FIG. 31 is an exemplary view of an exemplary print-on-demand system built on the modules of FIGS. 3A-3D and using the AFD file format.

FIG. 31 illustrates an example of a print-on-demand (PoD) system built on the above-mentioned modules. A PoD system is a production system where the whole-required volume of a document can be printed as it is needed, based on an existing digital file that represents the document. Typically, PoD systems use a computer-to-print method producing electronically made-up black and white or multicoloured printed products directly from an information system using a digitally controlled printing engine.

The following description will focus on differences over the system in FIG. 6. The PoD system of FIG. 31 may similarly include a Paper Design Tool 60 that is used for creating non-activated AFD files (.aft files) and storing them in an AFD repository 68. A PoD Tool 71 is provided to embody the functionalities of the Paper Activation Tool and the Paper Print Tool of FIG. 6. Thus, the PoD Tool 71 allows a user to select an AFD file in the AFD repository 68 for printing in a selected number of copies, whereupon the PoD Tool 71 automatically activates the selected AFD file with pattern license(s), derived from a License Database 72, and generates instructions for printing. The activated AFD file is then returned to the AFD repository 68 for storage. Suitably, the AFD file may only be activated with the exact number of pattern pages required in the printing operation, so that all pattern license(s) in the AFD file are consumed when the AFD file is returned to the repository 68. The PoD Tool 71 may also allow the user to add instance-specific data (graphics, areas, properties, etc) to each printed page. Corresponding dynamic page specifications will be added to the AFD file. Upon receipt of position data from a digital pen 65, a PoD application 66 on the computer/server 69 can retrieve the appropriate AFD file from the repository 68 for use in processing the position data. As indicated in FIG. 31, the dynamic page specifications in the AFD file may include a reference to a database 73. For example, each printed copy may be associated with an individual, and particulars of this individual may be stored in the database 73. Thus, the AFD file may include a unique database index for each printed copy, so that the receiving computer/server 69 can extract and use relevant particulars from the database 73 in its processing of position data recorded by the digital pen 65 on the printed copy 64.

The PoD system may be configured to allow any electronic document in any document repository 74 to be printed with coding pattern over its entire surface. This may be accomplished by configuring the Print Design Tool 60 to automatically convert the electronic document to a non-activated AFD file, by adding static page specifications that define page-wide pattern areas, so that each page instance is associated with a pattern area that spans the entire page. The original electronic document may be embedded in the AFD file, and/or a layout image for each document page may be added to the resources folder and referenced by the static page specification. The PoD Tool 71 may then activate and print the AFD file, resulting in the original electronic document being printed with unique pattern on each page. Pen strokes recorded with a digital pen 65 on the printed document 64 are conveyed to the computer/server 69 (which may or may not be the same physical device that hosts the PoD Tool 71) which retrieves the proper AFD file from the repository 68 and maps the pen strokes to the electronic document. The pen strokes may, e.g., be displayed against the layout image(s) and/or be stored as generated data in the AFD file.

This procedure may be completely hidden to the user, who merely selects a document for "position-coded printing" from a document repository 74, thereby bringing the Paper Design Tool 60 and the PoD Tool 71 to perform the above-described actions causing a printer 63 to print a required number of copies of the document, all with unique pattern pages.

10. AFD PEN SYSTEM

Figure 32:
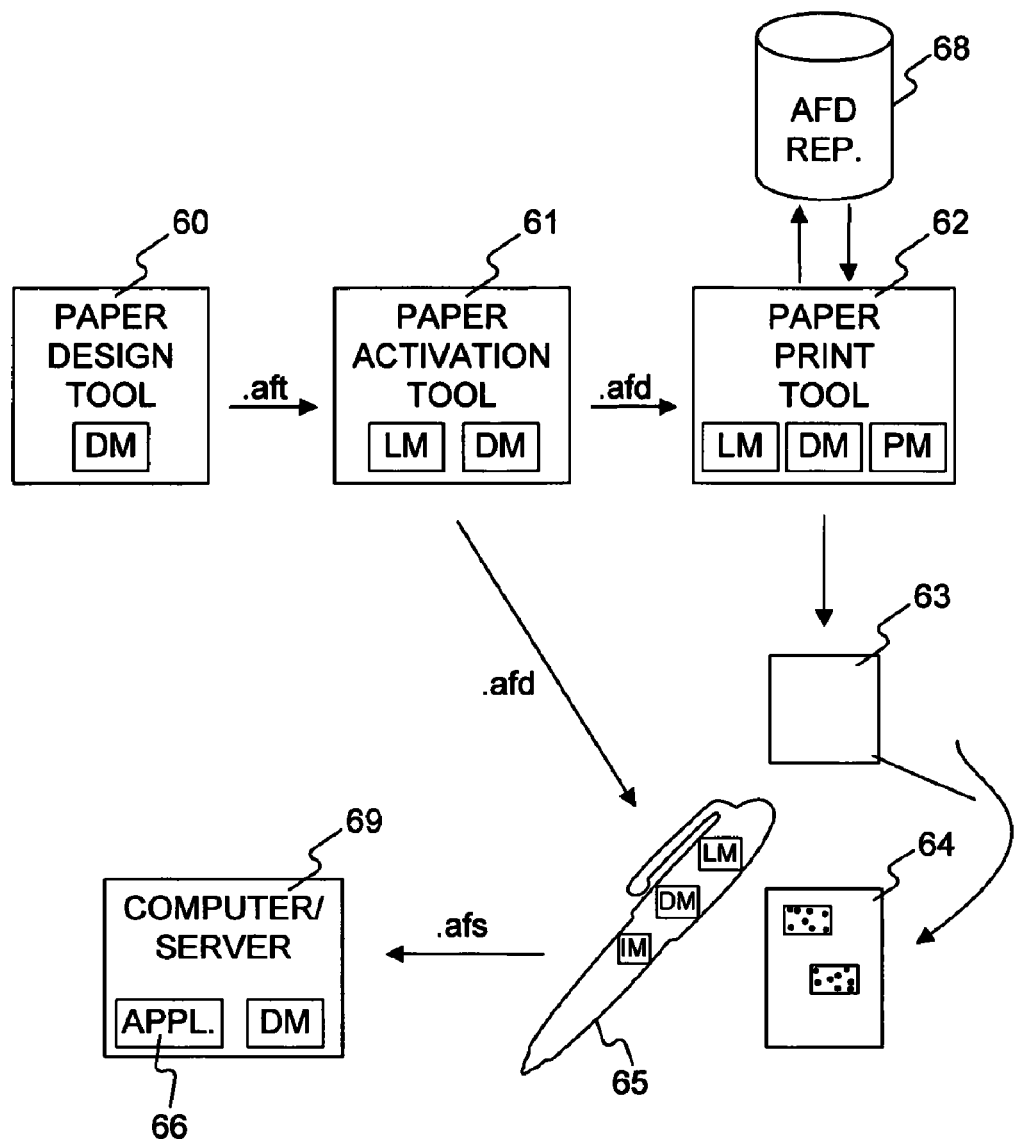
FIG. 32 is an exemplary view of an information management system in which AFD files are migrated to the digital pens.

FIG. 32 illustrates a DP&P system, corresponding to the system in FIG. 6, in which digital pens 65 are capable of importing activated AFD files, either with full information content or with certain content removed, to the extent it is not used by the pen control system. For example, any graphics collections and associated resources may be removed. The AFD files may emanate from the Paper Activation Tool 61, as illustrated, or from the Paper Print Tool 62. The digital pen 65 may thus store one or more imported AFD files in internal pen memory. The digital pen 65 suitably includes a Document Module that allows the pen control system to utilize at least part of the information in the imported AFD files. As indicated in FIG. 32, the pen 65 may also include a License Module allowing the pen control system to verify and/or check permissions of pattern licenses in the AFD files.

The AFD files may be transferred to the digital pen 65 in any conceivable way, including electronic downloading or uploading via a communications interface of the pen. In a variant, the AFD files are imported by scanning a product surface with the pen. For example, an AFD file may be embedded in a machine-readable code on the position-coded printout, or on a separate product surface. Other alternatives regarding transfer of files to digital pens are also possible. Further details and alternatives regarding transfer of files to digital pens are disclosed in Assignee's PCT publication WO2006/004506, which is incorporated herein by reference.

The AFD files may be used by the pen control system in different levels of refinement. In one embodiment, before outputting position data in a pen data file (.afs), the pen control system may locate the corresponding AFD file in pen memory and add data from this AFD file to the pen data file. For example, the pen may add aforesaid GUID to the pen data file. As mentioned above, this allows for simplified processing at the receiving computer/server, which can identify the proper processing application/AFD file by mapping GUIDs instead of mapping page addresses, thereby possibly improving processing speed. In another example, routing information (target_uri) from the AFD file is added to the pen data file, allowing the pen data file to be routed to the correct computer/server 69 for processing.

Furthermore, the entire content of the corresponding AFD file may be copied to the pen data file. In the scenario of FIG. 32, this means that all AFD file content is truly migrated throughout the DP&P system, and there is little or no need to store activated AFD files in a repository which is accessible to the receiving computer/server 69.

In another embodiment, the pen control system may operate based on the content of the AFD file. Specifically, the pen control system may be configured to map recorded position data against the area collections, and any associated property collections, and use any referenced resources such as audio files, images, executable code, etc.

In one example, the pen feedback may be controlled by the content of the AFD file, e.g., by the pen control system selectively activating an integrated vibrator, speaker, indicator LED, display, etc, based on recorded position data in relation to active areas.

In another example, based on the functionality described in Assignee's PCT publication WO2006/041387, which is incorporated herein by reference, the AFD file may contain one or more encryption keys to be used by the pen control system in encrypting the corresponding pen data file, or part thereof.

In yet an example, the AFD file may associate active areas with calls to functions implemented by the pen control system.

In still another example, the pen control system may limit its functionality based on the permissions parameter of the pattern licenses included in the AFD file. Such permissions may control the pen control system's ability to store position data, to output position data, to read and process barcodes, to encrypt output data, to carry out handwriting recognition (HWR) processing on recorded position data, etc. Furthermore, the pen control system may be configured to limit its use of the AFD file to the expiry date specified in the pattern license(s) of the AFD file (see FIG. 15). Further details and alternatives are given in aforesaid WO 2006/004506, as well as in Assignee's PCT publication WO 2007/117201 and PCT Application No. PCT/SE2008/050314, all of which are incorporated herein by reference.

Figure 33:
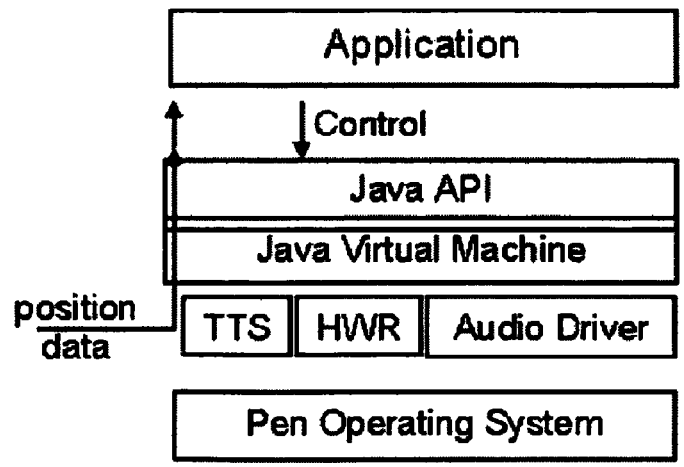
FIG. 33 illustrates an exemplary software architecture for running Java application code in a digital pen.

In another example, the AFD file may include software code which is to be interpreted, compiled or directly executed by the pen control system. The code can be written in any suitable programming language. The code, and thus the AFD file, may implement an "application" to be run by the pen. Thus, such an application code may be written to access and process the position data detected by the pen in real-time, and optionally to access hardware and/or software components in the pen, such as internal memory, communications interface and associated software, audio driver, speaker, display driver, display, vibrator, text-to-speech (TTS) conversion software, handwriting recognition (HWR) software, microphone, barcode reading software/hardware, data encryption software/hardware, etc. In one specific implementation, illustrated in FIG. 33, the pen control system includes a Java Virtual Machine, core classes and supporting Java libraries, as well as a custom Java API, on top of its operating system. The pen control system is thus formed as a Java-based runtime system. The application code, which is distributed to the pen in the AFD file, is written in Java language to be run in real time by the pen control system. The application code may be associated with one or more page addresses, so that the pen control system is caused to launch (instantiate) the Java application whenever the pen detects position data from such page address(es). Depending on implementation, the position data may emanate directly from a decoding system in the pen, or be provided as events from an Interaction Module in the pen. The Java application may be configured to use the area collections, property collections and resources that are available in the AFD file. If the AFD file is implemented as a ZIP file, it may include Java-specific metadata (e.g., a manifest file) in the AFD file, thereby identifying the AFD file to the Java-based runtime system as a so-called JAR (Java Archive) file. A JAR file is a customary container for distributing Java application code (class files). Thus, the Java-based runtime system is able to access the AFD file as a JAR file, and extract relevant content for launching the Java application. The use, functionality and structure of such application code and pen control systems for digital pens are further disclosed in Assignee's PCT publications WO 2007/097693 and WO 2007/117201, which are incorporated herein by reference.

As is readily appreciated by a person skilled in the art, other embodiments than the ones disclosed above are equally possible within the scope and spirit of the invention, which is defined and limited only by the appended claims.

For example, it is to be understood that the Interaction Module is provided to potentially facilitate the development of controlling software for digital pens. Thus, the Interaction Module is not needed if the pen control system is designed to operate directly on the position data detected by the pen's decoding system. Furthermore, the Document Module is not needed if the digital pen does not handle AFD files internally, e.g. if pen data is output in non-AFD format.

It is also possible that the digital pen is configured to convey position data/events to a nearby supporting device (e.g. a PC, PDA or mobile phone) which includes a Document Module that allows the supporting device to handle AFD files, and possibly an Interaction Module to facilitate interaction with the real-time data from the pen. The supporting device may be configured to implement any pen functionality discussed above with respect to FIGS. 32-33. For example, the supporting device may create pen data files in AFD format and convey these files to the back-end system, and/or it may import activated AFD files and access their content for processing the position data/events received from the digital pen.

It is also to be noted that the pen data need not be conveyed to a back-end system for processing. Instead, the pen data processing may be completed at the front-end, i.e., at the location of the digital pen user. Such a front-end processing system may be located in the digital pen itself or in the supporting device.

Furthermore, the skilled person will realize that the foregoing embodiments, examples and implementations can be combined in a number of different ways. For example, pens capable of importing AFD file content (FIG. 32) may be used in a PoD system (FIG. 31).

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Examples of hardware include computing or processing systems, including personal computers, servers, laptops, mainframes, microprocessors and the like. Additionally, although aspects of the invention are described for being stored in memory, one skilled in the art will appreciate that these aspects can also be stored on other types of computer-readable media, such as secondary storage devices, for example, hard disks, floppy disks, or CD-ROM, or other forms of RAM or ROM.

Computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets. One or more of such software sections or modules can be integrated into a computer system or existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A computer-readable storage medium storing a program for causing a computer to perform a method for creating an electronic representation of a position-coded product, the method comprising:
   accessing an electronic document file comprising layout specifications for a set of document pages;
   adding to the electronic document file an indication of a number of copies of the set of document pages;
   adding to the electronic document file at least one pattern license file including addresses corresponding to a set of pattern pages, the at least one pattern license file further including a starting page address and a license parameter identifying at least one property of the at least one pattern license file, each of the addresses in the at least one pattern license file identifying at least one pattern page included in the set of pattern pages, each of the pattern pages being a unique part of a position-coding pattern, wherein the at least one pattern license file associates the set of pattern pages with the position-coding pattern before and independent of an action of printing copies of the position-coded product; and
   adding to the electronic document file metadata that indicates an ordering of the pattern pages identified by the at least one pattern license file, wherein the document pages are implicitly associated, copy for copy, with the pattern pages according to the ordering.

2. The computer-readable storage medium of claim 1, wherein each pattern page is represented by a page address, and wherein the pattern license file identifies one or more ranges of consecutive page addresses.

3. The computer-readable storage medium of claim 2, wherein the metadata defines an ordering of ranges, wherein the ordering of the pattern pages is based on the ordering of ranges, and wherein the pattern pages within each range are ordered according to page address.

4. The computer-readable storage medium of claim 2, wherein the electronic document file further comprises an indication of a total page address range spanned by the ranges included in the electronic document file.

5. The computer-readable storage medium of claim 1, wherein the metadata comprises a print parameter indicating that one or more of the copies has been printed.

6. The computer-readable storage medium of claim 5, wherein the print parameter indicates a starting pattern page for non-printed copies in the electronic document file, and wherein the document pages of the non-printed copies are associated, copy for copy, with the pattern pages by dead reckoning from the starting pattern page.

7. The computer-readable storage medium of claim 1, wherein one or more of the document pages comprises a layout specification that defines at least human-understandable graphics on the document page.

8. The computer-readable storage medium of claim 7, wherein the layout specification further defines at least one pattern area on the document page, the pattern area comprising a pattern from the associated pattern page.

9. The computer-readable storage medium of claim 8, wherein location coordinates on one of the pattern pages and one of the document pages defines the location of the pattern area on the document page and its content of pattern, by using an implicit and overlapping relation between the document page and the associated pattern page and by projecting pattern from the pattern page onto the document page within the area defined by the location coordinates.

10. The computer-readable storage medium of claim 7, wherein the layout specification further identifies at least one active area on the associated pattern page and processing data associated with the active area, and wherein the processing data provides instructions for processing of position data originating from the active area.

11. The computer-readable storage medium of claim 7, wherein the layout specification comprises a static part common to all copies of the document page, and a dynamic part unique to one of the copies of the document page.

12. The computer-readable storage medium of claim 11, wherein the electronic document file further comprises predetermined data storage sections comprising:
   a metadata section for holding the metadata,
   a pattern section for holding the pattern license file,
   a static section for holding the static part of the layout specification, and
   a dynamic section for holding the dynamic part of the layout specification.

13. The computer-readable storage medium of claim 12, wherein the metadata section further stores mapping data for associating the document pages with the pattern pages.

14. The computer-readable storage medium of claim 12, wherein the dynamic part of the layout specification is stored in association with an index.

15. The computer-readable storage medium of claim 12, wherein the metadata section comprises an electronic destination address.

16. The computer-readable storage medium of claim 12, wherein the metadata section comprises a unique identifier of the electronic document file.

17. The computer-readable storage medium of claim 16, wherein the unique identifier is generated based on content of the electronic document file.

18. The computer-readable storage medium of claim 17, wherein the content excludes content of the pattern section and the dynamic section.

19. The computer-readable storage medium of claim 7, wherein each pattern page is associated with a pattern coordinate system with a known origin on the pattern page, wherein each document page is associated with a product coordinate system with a known origin on the document page, and wherein the layout specification is given in one of the pattern coordinate system and the product coordinate system.

20. The computer-readable storage medium of claim 19, wherein the layout specification is given in the product coordinate system.

21. The computer-readable storage medium of claim 1, wherein tying data is calculated and added to the pattern license file.

22. The computer-readable storage medium of claim 1, wherein the electronic document file further comprises a parameter indicating a number of reserved document pages for each copy, and wherein each reserved document page is associated with a pattern page and the reserved document pages are not included in the position-coded product.

23. The computer-readable storage medium of claim 1, wherein the electronic document file further comprises a parameter indicating whether a specific document page is to be associated with a pattern page.

24. The computer-readable storage medium of claim 1, wherein the electronic document file further comprises a storage section for data generated in connection with the position-coded product.

25. The computer-readable storage medium of claim 24, wherein the generated data includes at least one of: position data, an image, an audio file, bar code data, and character data resulting from character-recognition processing of position data.

26. The computer-readable storage medium of claim 1, wherein the electronic document file is an archive file.

27. The computer-readable storage medium of claim 26, wherein the archive file is a zip file.

28. The computer-readable storage medium of claim 26, wherein the archive file comprises at least one Java class file and a manifest file.

29. The computer-readable storage medium of claim 1, wherein the method further comprises adding to the electronic document file instance data uniquely associated with one of the copies.

30. The computer-readable storage medium of claim 29, wherein the instance data comprises a layout element that defines a visual property of the one copy.

31. The computer-readable storage medium of claim 29, wherein the instance data is recorded in connection with the position-coded product represented by the one copy.

32. The computer-readable storage medium of claim 1, wherein the method further comprises activating the electronic document file for a number of product copies, and wherein each product copy contains the set of document pages.

33. The computer-readable storage medium of claim 32, wherein the method further comprises printing the activated product copies by deriving the document pages and the associated pattern pages based on the electronic document file.

34. A computer-readable storage medium storing a program for causing a computer to perform a method for enabling printing of a selected number of copies of a position-coded product, the method comprising:
 accessing an electronic document file, wherein the electronic document file comprises:
  an indication of a number of copies,
  a set of document pages for each copy,
  at least one pattern license file including addresses corresponding to a set of pattern pages, the at least one pattern license file further including a starting page address and a license parameter identifying at least one property of the at least one pattern license file, each of the addresses in the at least one pattern license file identifying at least one pattern page included in the set of pattern pages, each of the pattern pages being a unique part of a position-coding pattern, wherein the at least one pattern license file associates the set of pattern pages with the position-coding pattern before and independent of an action of printing copies of the position-coded product, and
  metadata indicating an ordering of the pattern pages, wherein the document pages are implicitly associated, copy for copy, with the pattern pages according to the ordering;
 deriving the metadata and the set of document pages from the electronic document file;
 mapping the document pages, copy for copy within the selected number of copies, to the pattern pages identified by the at least one pattern license file, according to the ordering; and
 generating a printable representation of each copy of each document page merged with its mapped pattern page.

35. The computer-readable storage medium of claim 34, wherein the mapping comprises dead reckoning from a starting pattern page derived from the metadata.

36. The computer-readable storage medium of claim 34, wherein the method further comprises adding an updated starting pattern page to the metadata to indicate non-mapped pattern pages in the ordering.

37. The computer-readable storage medium of claim 34, wherein the method further comprises verifying that the selected number of copies does not exceed the number of copies.

38. The computer-readable storage medium of claim 37, wherein the method further comprises, if the selected number of copies exceeds the number of copies, adding at least one further pattern license file to the electronic document file.

39. A method for representing a position-coded product in a digital pen system, the method comprising:
 creating an electronic document file of a predetermined format, the electronic document file comprising a set of document pages;
 adding to the electronic document file at least one pattern license file including addresses corresponding to a set of pattern pages having a given ordering, the at least one pattern license file further including a starting page address and a license parameter identifying at least one property of the at least one pattern license file, each of the addresses in the at least one pattern license file identifying at least one pattern page included in the set of pattern pages, wherein each of the pattern pages is a unique part of a position-coding pattern, and the at least one pattern license file associates the set of pattern pages with the position-coding pattern before and independent of an action of printing copies of the position-coded product;
 activating the electronic document file for a number of product copies, wherein each product copy contains the set of document pages, and wherein the document pages are implicitly associated, in copy for copy order, with the pattern pages identified by the at least one pattern license file;
 printing a second number of the activated product copies by deriving the document pages and the associated pattern pages based on the electronic document file; and
 indicating the activated product copies thus-printed in the electronic document file.

40. The method of claim 39, further comprising adding at least one further pattern license file to the activated electronic document file.

41. The method of claim 39, wherein one or more of the document pages comprises a layout specification that defines at least human-understandable graphics on the document page.

42. The method of claim 41, wherein the layout specification further identifies at least one active area on the associated pattern page and processing data associated with the active area, and wherein the processing data provides instructions for processing of position data originating from the active area.

43. The method of claim 39, further comprising providing the activated electronic document file, or part thereof, to an application program for processing position data recorded by a digital pen from one or more of the printed product copies.

44. The method of claim 39, further comprising providing the activated electronic document file, or part thereof, to a digital pen.

45. The method of claim 44, wherein the digital pen interacts with position data recorded from one or more of the printed product copies based on the activated electronic document file.

46. The method of claim 44, wherein the digital pen generates an output file in the predetermined format.

47. The method of claim 46, wherein the digital pen includes at least part of the electronic document file in the output file.

48. A computer system for enabling data collection, comprising:
   a paper design component for creating an electronic document file of a predetermined format, wherein the electronic document file comprises a set of document pages;
   a paper activation component for:
      adding to the electronic document file at least one pattern license file including addresses corresponding to a set of pattern pages having a given ordering, the at least one pattern license file further including a starting page address and a license parameter identifying at least one property of the at least one pattern license file, each of the addresses in the at least one pattern license file identifying at least one pattern page included in the set of pattern pages, wherein each of the pattern pages is a unique part of a position-coding pattern, and the at least one pattern license file associates the set of pattern pages with the position-coding pattern before and independent of an action of printing copies of the position-coded product;
      activating the electronic document file for a number of product copies, wherein each product copy contains the set of document pages, and wherein the document pages are implicitly associated, in copy for copy order, with the pattern pages identified by the at least one pattern license file; and
   a paper print component for printing a second number of the activated product copies by deriving the document pages and the associated pattern pages based on the electronic document file and indicating the activated product copies thus-printed in the electronic document file.

49. The computer system according to claim 48, further comprising a digital pen for outputting position data recorded from a printout of one of the activated product copies.

50. The computer system according to claim 49, further comprising a form processing component for processing the position data in accordance with processing rules associated with the document pages.

51. The computer system according to claim 48, wherein the paper print component is a printer.

52. A computer-readable storage medium storing a program for causing a computer to perform a method for creating an electronic representation of a position-coded product, the method comprising:
   accessing an electronic document file comprising layout specifications for a set of document pages;
   adding to the electronic document file an indication of a number of copies of the set of document pages;
   adding to the electronic document file at least one pattern license file identifying, a set of pattern pages, each pattern page being a unique part of a position-coding pattern; and
   adding to the electronic document file metadata that indicates an ordering of the pattern pages, wherein the document pages are implicitly associated, copy for copy, with the pattern pages according to the ordering, wherein the electronic document file includes tying data that ties the pattern license file to the electronic document file, the tying data including a digital signature calculated based on the pattern license file and non-license data in the electronic document file.

* * * * *